(12) United States Patent
Azumi et al.

(10) Patent No.: US 9,903,758 B2
(45) Date of Patent: Feb. 27, 2018

(54) SPECTRAL MEASUREMENT DEVICE AND ANALYSIS APPARATUS

(71) Applicants: Junichi Azumi, Miyagi (JP); Hidetaka Noguchi, Hyogo (JP); Hidenori Kato, Hyogo (JP); Masashi Suematsu, Hyogo (JP); Masayuki Fujishima, Kanagawa (JP)

(72) Inventors: Junichi Azumi, Miyagi (JP); Hidetaka Noguchi, Hyogo (JP); Hidenori Kato, Hyogo (JP); Masashi Suematsu, Hyogo (JP); Masayuki Fujishima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/606,298

(22) Filed: May 26, 2017

(65) Prior Publication Data
US 2017/0350759 A1    Dec. 7, 2017

(30) Foreign Application Priority Data

Jun. 3, 2016 (JP) ................. 2016-112046
Nov. 29, 2016 (JP) ................. 2016-231106

(51) Int. Cl.
 *G01J 3/28* (2006.01)
 *G01J 3/18* (2006.01)
 *G01J 3/02* (2006.01)

(52) U.S. Cl.
 CPC ............. *G01J 3/18* (2013.01); *G01J 3/021* (2013.01); *G01J 3/28* (2013.01)

(58) Field of Classification Search
 CPC ........ G01J 3/02; G01J 3/10; G01J 3/18; G01J 3/26; G01J 3/28
 See application file for complete search history.

(56) References Cited

U.S. PATENT DOCUMENTS 6,597,763 B2    7/2003  Höller et al.
2012/0069421 A1*  3/2012  Fu ..................... G01J 3/0205
                                                      359/290

FOREIGN PATENT DOCUMENTS

| EP | 3104146      | 12/2016 |
| JP | 2002-107226  | 4/2002  |
| JP | 2015-148485  | 8/2015  |

\* cited by examiner

*Primary Examiner* — Abdullahi Nur
(74) *Attorney, Agent, or Firm* — IPUSA, PLLC

(57) ABSTRACT

A spectral measurement device includes a light reflection grating having a plurality of movable gratings and a movable grating drive unit that displaces the movable gratings to alter a grating pattern of the light reflection grating, a light detecting element that detects light incident on the light reflection grating, a storage unit storing a relationship between a light quantity to be detected by the light detecting element and corresponding light intensities at differing wavelengths for different grating patterns, and a computation unit that calculates light intensities at the differing wavelengths of the light incident on the light reflection grating based on the light quantity of the incident light detected by the light detecting element for each of the different grating patterns by altering the grating pattern based on the relationship between the light quantity and the corresponding light intensities for the different grating patterns stored in the storage unit.

19 Claims, 23 Drawing Sheets

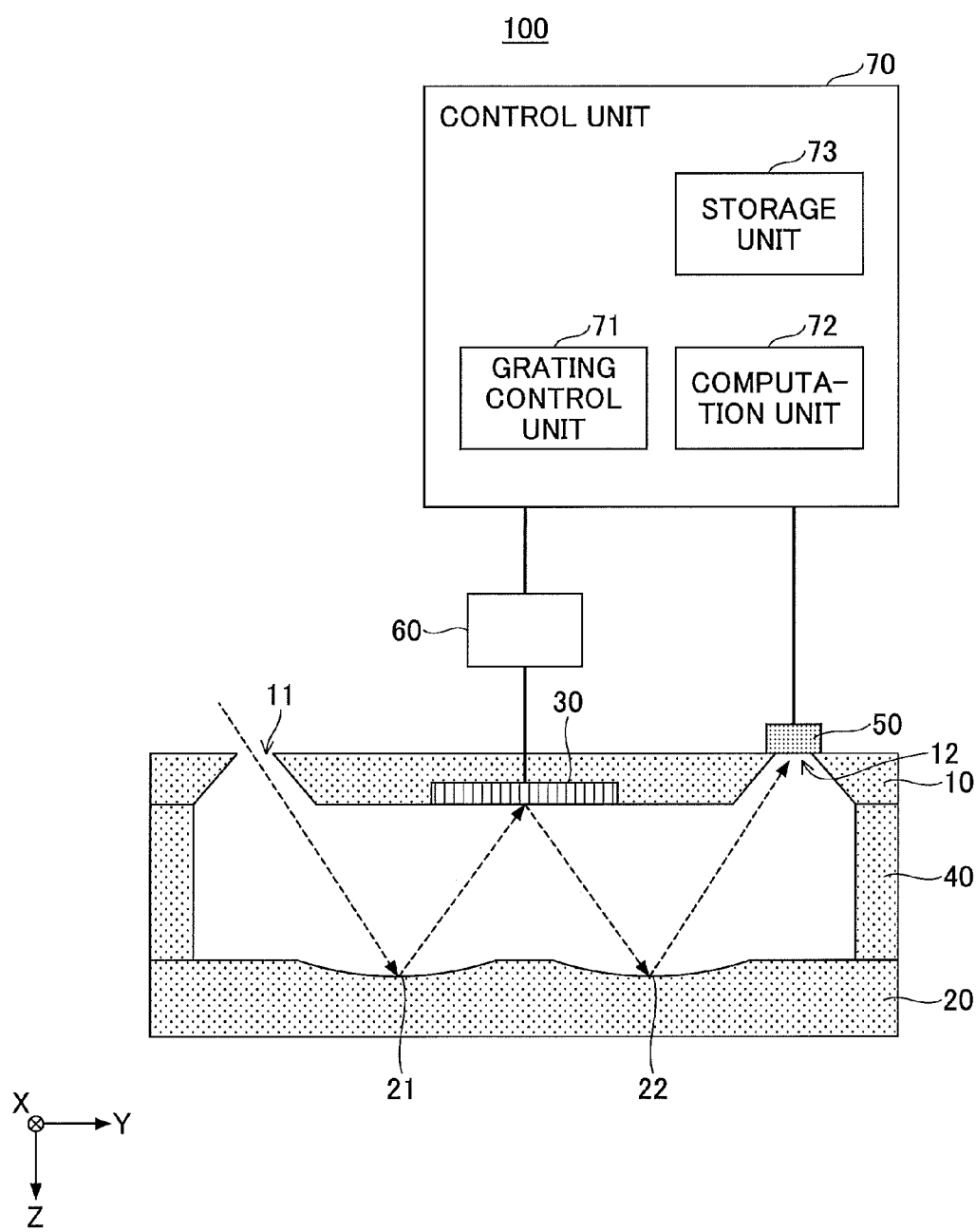

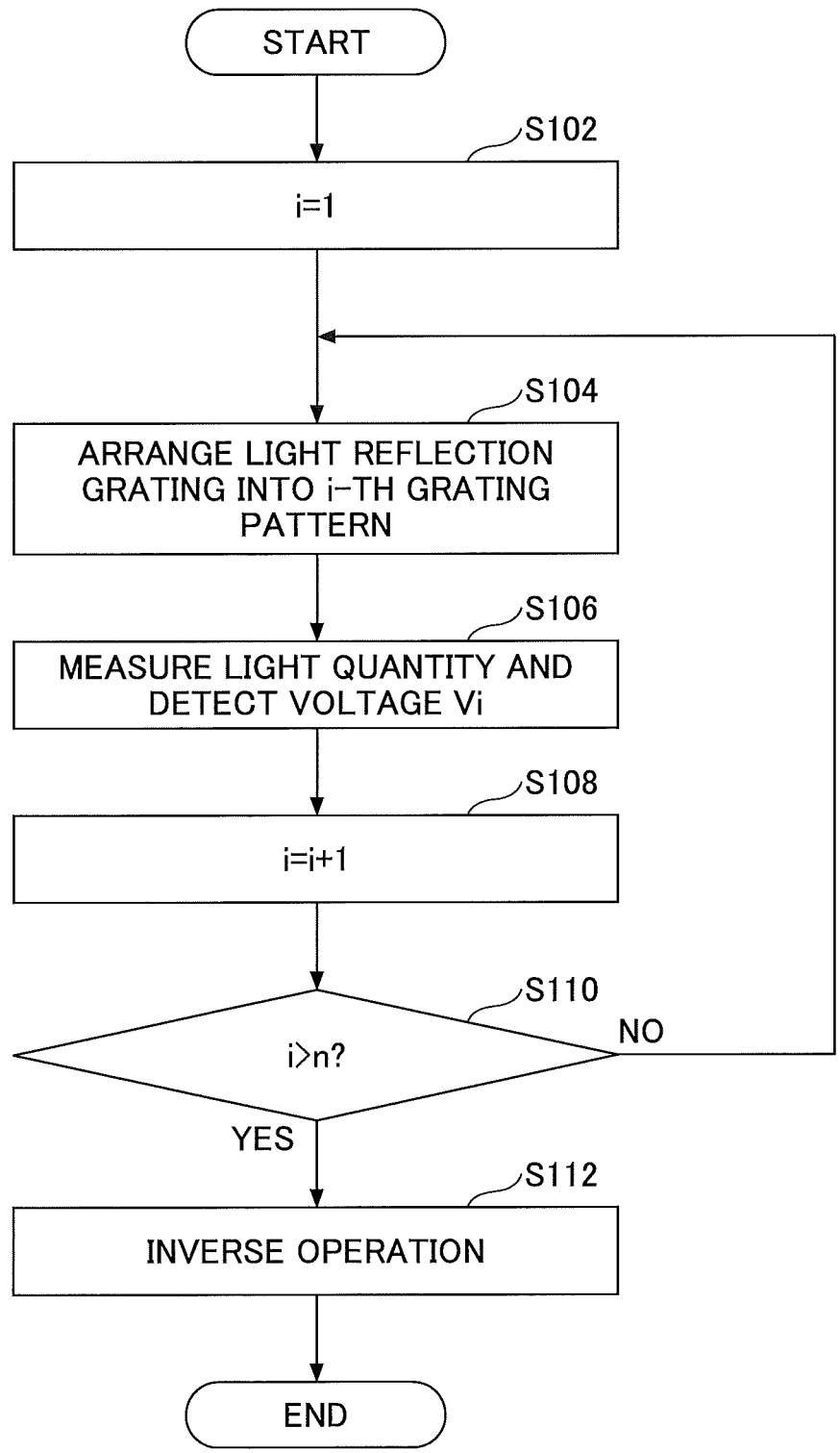

SPECTRAL MEASUREMENT DEVICE AND ANALYSIS APPARATUS

CROSS-REFERENCE TO RELATED APPLICATIONS

The present application claims priority under 35 U.S.C. § 119 to Japanese Patent Application No. 2016-112046 filed on Jun. 3, 2016 and Japanese Patent Application No. 2016-231106 filed on Nov. 29, 2016, the entire contents of which are incorporated herein by reference.

BACKGROUND OF THE INVENTION

1. Field of the Invention

The present invention relates to a spectral measurement device and an analysis apparatus.

2. Description of the Related Art

Spectrometers are typically large and stationary, and researchers have generally used spectrometers in a lab setting for spectroscopic analysis. In recent years, demand for on-site spectroscopic analysis has been growing, and miniaturized spectrometers are being developed. Light of various wavelengths, such as ultraviolet light, visible light, near-infrared light, or infrared light, may be used in spectroscopic analysis depending on the analysis target. Near-infrared light including a wavelength region also referred to as "in vivo window" has high penetration in multi-moisture specimens including biological tissue and can be used to perform noninvasive measurement of a specimen. As such, near-infrared light spectrometers are useful for conducting measurements in various settings including outdoor settings, for example. Thus, efforts are currently being made to develop a miniaturized spectrometer that uses the near-infrared light region.

For example, a compact near-infrared spectrometer is known that includes a concave diffraction grating as a spectroscopic element having a wavelength dispersing function and a light collecting function, and a one-dimensional array sensor that detects dispersed light. The one-dimensional array sensor may be configured by a Si photodiode having detection sensitivity in a visible region to a near-infrared region with a wavelength of up to 1100 nm, and an InGaAs photodiode having a detection sensitivity in a near infrared region with a wavelength of 900 nm to 2500 nm, for example.

As a method of reducing the size and cost of a spectroscope, one photodiode may be used instead of a one-dimensional array sensor, and the diffraction grating may be rotated, for example. However, it is rather difficult to spectrally separate light with a small device at a low cost using the method of rotating the diffraction grating, and reliable spectral measurements may not be stably obtained owing to influences of vibrations caused by the rotation, for example.

[Background Art] Japanese Unexamined Patent Application Publication No. 2015-148485

SUMMARY OF THE INVENTION

An aspect of the present invention is directed to providing a technique for stably obtaining reliable spectral measurements by spectrally separating light using a small device at a low cost.

According to one embodiment of the present embodiment, a spectral measurement device is provided that includes a light reflection grating including a plurality of movable gratings arranged side by side along a lateral direction to have a same length in a longitudinal direction and a movable grating drive unit configured to displace the plurality of movable gratings to alter a grating pattern of the light reflection grating, a light detecting element configured to detect light that is incident on the light reflection grating and reflected by the light reflection grating, a storage unit storing a relationship between a light quantity to be detected by the light detecting element and corresponding light intensities at a plurality of different wavelengths for each of a plurality of different grating patterns of the light reflection grating, and a computation unit configured to calculate light intensities at the plurality of different wavelengths of the light incident on the light reflection grating based on a detected light quantity of the incident light detected by the light detecting element for each of the plurality of different grating patterns by altering the grating pattern of the light reflection grating based on the relationship between the light quantity to be detected by the light detecting element and the corresponding light intensities at the plurality of different wavelengths for each of the plurality of different grating patterns stored in the storage unit.

BRIEF DESCRIPTION OF THE DRAWINGS

FIG. 2 is a diagram illustrating an example configuration of a spectral measurement device according to a first embodiment of the present invention;

FIG. 7 is a flowchart illustrating an example spectral measurement method implemented by the spectral measurement device according to the first embodiment;

DESCRIPTION OF THE EMBODIMENTS

Figure 1:
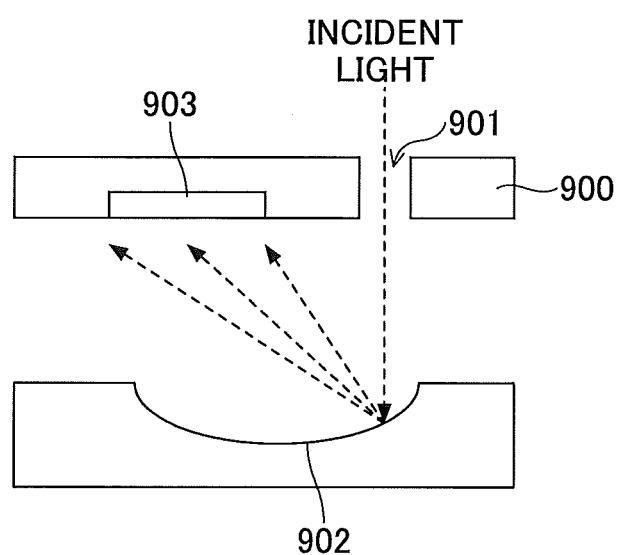
FIG. 1 is a diagram illustrating an example configuration of a spectrometer.

In the following, embodiments of the present invention are described with reference to the accompanying drawings. Note that in the following descriptions, elements having the same features or functions are given the same reference numerals and overlapping descriptions thereof may be omitted.

First Embodiment

First, a general configuration of a spectrometer using a concave diffraction grating will be described with reference to FIG. 1. The spectrometer of FIG. 1 includes a concave diffraction grating 902 that diffracts and separates the wavelengths of light incident through a slit 901 formed in a substrate 900. Light that has been diffracted by the concave diffraction grating 902 is incident on a photodetector array 903 formed on the substrate 900, and a spectrum of the diffracted light can be obtained by the photodetector array 903.

The wavelength sensitivity (detectable wavelength region) of a photodetector forming the photodetector array 903 is one of the factors determining the measurable wavelength region of the spectrometer having the above configuration. The wavelength sensitivity of the photodetector is determined by the material forming the photodetector. In a commonly used Si photodiode, the detectable wavelength range is up to 1100 nm, but in order to measure a wavelength region that is longer, a compound semiconductor photodiode, such as a InGaAs photodiode, has to be used, for example. Compound semiconductor photodiodes are relatively inexpensive if they are of a single pixel, but when they are used in an array element, such as photodiode array, they may become quite expensive such that a spectrometer using such a photodiode array becomes quite expensive. For this reason, it is difficult to fabricate a spectrometer using a conventional concave diffraction grating that is within a price range for widespread use, and it has been a challenge to develop a compact and inexpensive spectrometer having a wide detection wavelength range.

(Spectral Measurement Device)

In the following, a spectral measurement device 100 according to a first embodiment of the present invention will be described with reference to FIG. 2.

In FIG. 2, the spectral measurement device 100 according to the present embodiment includes a first substrate 10 and a second substrate 20. The first substrate 10 is provided with a light entrance portion 11 and a light exit portion 12 that penetrate through the first substrate 10 from one surface to the other surface of the first substrate 10. Also, on one surface of the first substrate 10, a light reflection grating 30 is provided between the light entrance portion 11 and the light exit portion 12. Also, a first concave light reflecting portion 21 and a second concave light reflecting portion 22 are provided on one surface of the second substrate 20. Further, a light detecting element 50 is provided on the other surface of the first substrate 10 where the light exit portion 12 is formed. The light detecting element 50 may be a single pixel photodiode chip made of Si, Ge, or InGaAs, for example.

The spectral measurement device 100 according to the present embodiment also includes a movable grating drive power source 60 as a movable grating drive unit that is connected to the light reflection grating 30, and a control unit 70 that is connected to the movable grating drive power source 60 and the light detecting element 50. The control unit 70 includes a grating control unit 71, a computation unit 72, and a storage unit 73.

The broken line arrows in FIG. 2 represent an optical path of light incident into the light entrance portion 11. In the spectral measurement device 100 according to the present embodiment, light entering the light entrance portion 11 is reflected by the first concave light reflecting portion 21 of the second substrate 20 to be incident on the light reflection grating 30 formed on the first substrate 10 and reflected by the light reflection grating 30. The light reflected by the light reflection grating 30 is reflected by the second concave light reflecting portion 22 of the second substrate 20 and focused by the light exit portion 12 of the first substrate 10 to form an image. The light focused in the above-described manner is detected by the light detecting element 50.

Note that the first substrate 10 and the second substrate 20 are fixed in place by a spacer 40 that are provided between the first substrate 10 and the second substrate 20 such that one surface of the first substrate 10 and one surface of the second substrate 20 face each other. Also, when fixing the first substrate 10 and the second substrate 20 by the spacer 40, the first substrate 10 and the second substrate 20 are aligned so as to be in a desired position.

Note that a spectral measurement device according to an embodiment of the present invention is not limited to the wafer-level spectral measurement device 100 as illustrated in FIG. 2 as long as it includes a light reflection grating as described below. Also, although the light entrance portion 11 and the light exit portion 12 are provided on the first substrate 10 in the spectral measurement device 100 of FIG. 2, in other embodiments, slits formed in a separate substrate from the first substrate 10 may be provided as a light entrance portion and a light exit portion, for example.

(Light Reflection Grating)

Figure 3A:
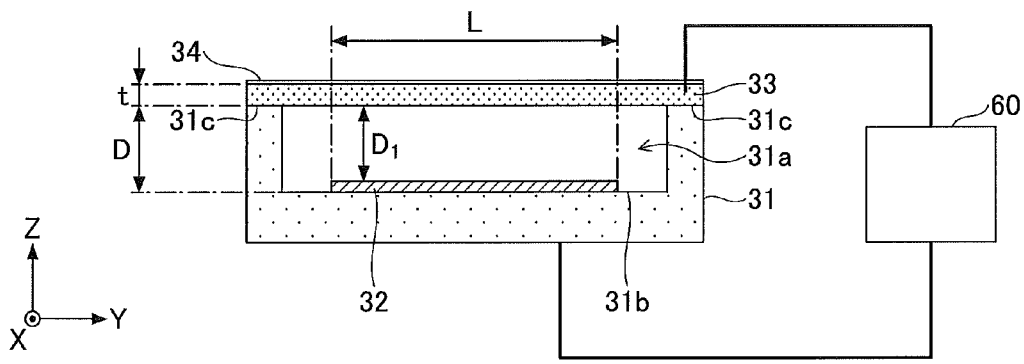
FIGS. 3A and 3B are diagrams illustrating an example configuration of a light reflection grating according to the first embodiment.
Figure 3B:
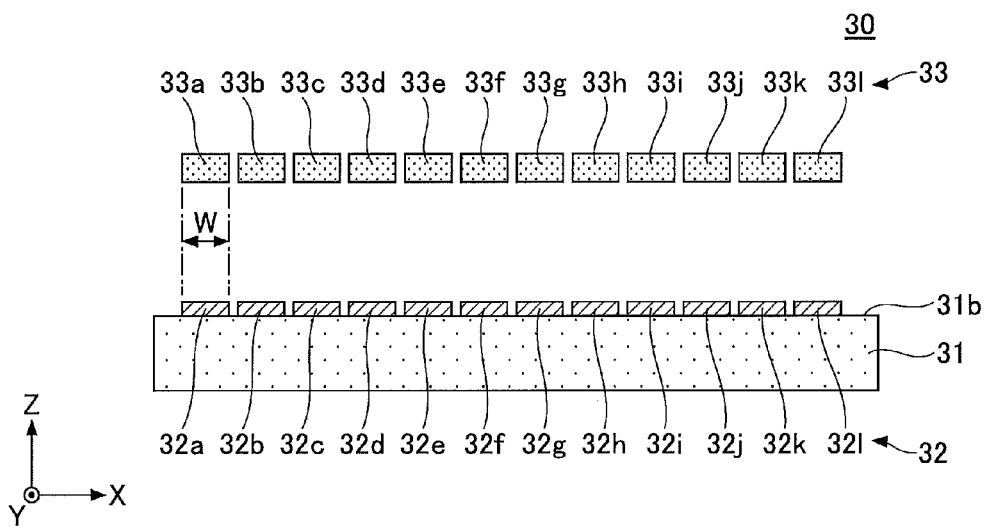

In the following, the light reflection grating 30 according to the present embodiment will be described with reference to FIGS. 3A and 3B. FIG. 3A is a cross-sectional view of the light reflection grating 30 across a longitudinal direction of a grating forming the light reflection grating 30, and FIG. 3B is a cross-sectional view of the light reflection grating 30 across a lateral direction perpendicular to the longitudinal direction of the light reflection grating 30. Note that in the figures illustrating the light reflection grating 30 according to the present embodiment, direction X represents the lateral direction of the light reflection grating 30, direction Y represents the longitudinal direction of the light reflection grating 30, and direction Z represents a direction perpendicular to direction X and direction Y.

Also, in the following descriptions of embodiments of the present invention, a plurality of fixed electrodes 32a to 32l may generically be referred to as "fixed electrode 32" and a plurality of movable gratings 33a to 33l may generically be referred to as "movable grating 33". Further, in the light reflection grating 30 according to the present embodiment, twelve fixed electrodes 32a to 32l and twelve movable gratings 33a to 33l are provided as an example. However, the number of fixed electrodes 32 and the number of movable gratings 33 provided in the light reflection grating 30 is not limited to twelve.

The light reflection grating 30 according to the present embodiment includes a substrate 31 having a recess 31a formed therein. The fixed electrodes 32a to 32l are formed on a bottom surface 31b of the recess 31a. Also, the movable gratings 33a to 33l are formed on an upper surface 31c of an outer edge of the substrate 31 surrounding the recess 31a, and in this way, the movable gratings 33a to 33l cover the recess 31a. The plurality of fixed electrodes 32a to 32l and the plurality of movable gratings 33a to 33l are arranged to extend the same length in the longitudinal direction and are arranged side by side in the lateral direction.

Also, as illustrated in FIG. 3A, the two longitudinal direction side ends of each of the movable gratings 33a to 33l are supported by the upper surface 31c of the outer edge surrounding the recess 31a of the substrate 31. In this way, the movable grating 33 is arranged to have a doubly supported beam configuration. In the present embodiment, for example, the depth D of the recess 31a formed in the substrate 31 may be 10 µm to 100 µm, and the length L in the longitudinal direction of the fixed electrode 32 may be 100 µm to 3 mm. The width W of the fixed electrode 32 and the movable grating 33 in the lateral direction may be 1 µm to 100 µm, and the thickness t of the movable grating 33 may be 1 µm to 10 µm.

In the present embodiment, the fixed electrode 32 and the movable grating 33 form a pair to face each other. That is, the fixed electrodes 32a to 32l and the movable grids 33a to 33l are respectively arranged to face each other. Specifically, the fixed electrode 32a and the movable grating 33a, the fixed electrode 32b and the movable grating 33b, the fixed electrode 32c and the movable grating 33c, the fixed electrode 32d and the movable grating 33d, the fixed electrode 32e and the movable grating 33e, and the fixed electrode 32f and the movable grating 33f are arranged to face each other. Further, the fixed electrode 32g and the movable grating 33g, the fixed electrode 32h and the movable grating 33h, the fixed electrode 32i and the movable grating 33i, the fixed electrode 32j and the movable grating 33j, the fixed electrode 32k and the movable grating 33k, and the fixed electrode 32l and the movable grating 33l are arranged to face each other. More specifically, the fixed electrodes 32a to 32l and the movable gratings 33a to 33l are arranged such that one surface of each of the fixed electrodes 32a to 32l face one surface of the corresponding movable gratings 33a to 33l.

The substrate 31 may be made of an insulator or a semiconductor such as Si. The light reflection grating 30 according to the present embodiment may be formed on one surface of the first substrate 10, or on a substrate other than the first substrate 10. In the case where the light reflection grating 30 according to the present embodiment is formed on one surface of the first substrate 10, the first substrate 10 can be used as the substrate 31 of the light reflection grating 30, and in this way, further downsizing and cost reduction can be achieved. Also, in the case where the substrate 31 is made of a semiconductor, an insulating film is formed on the bottom surface 31b of the recess 31a of the substrate 31, and the fixed electrodes 32a to 32l are formed on the insulating film. An insulating film is also formed on the upper surface 31c of the substrate 31, and the movable gratings 33a to 33l are formed on the insulating film. Further, in some embodiments, an insulating film may be formed on the entire surface that is exposed in the recess 31a of the substrate 31, for example.

Each of the fixed electrodes 32a to 32l is made of an electrode material used in various semiconductor devices, such as aluminum (Al), platinum (Pt), gold (Au), and other conductive metal materials, for example. Each of the movable gratings 33a to 33l may be made of a conductive metal material or a semiconductor material. A reflection film 34 for reflecting light is formed on the other surface of the movable gratings 33a to 33l on the opposite side of the one surface facing the corresponding fixed electrodes 32a to 32l. The reflection film 34 is a metal film that may be made of aluminum, silver, gold or the like according to the wavelength of light to be spectrally analyzed.

In the spectral measurement device 100 according to the present embodiment, the movable grating drive power source 60 is connected to the fixed electrodes 32a to 32l and the movable gratings 33a to 33l, and the movable grating drive power source 60 is configured to apply a voltage between the corresponding pairs of the fixed electrodes 32a to 32l and the movable gratings 33a to 33l.

Figure 4:
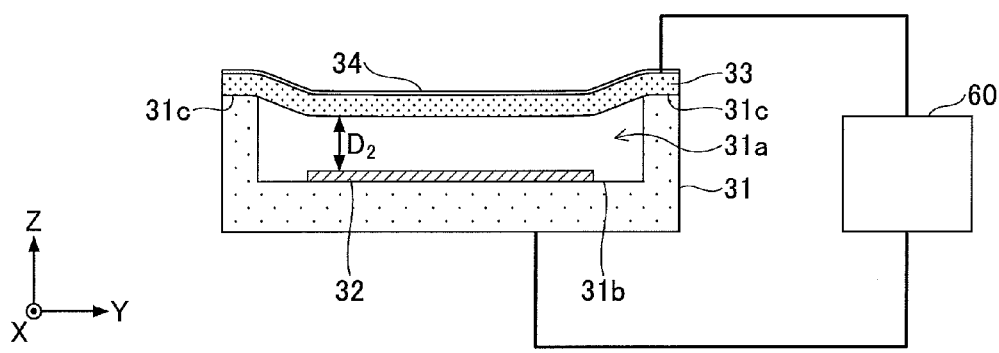
FIG. 4 is a diagram illustrating an example operation of the light reflection grating according to the first embodiment.

When the potential difference between the fixed electrode 32 and the movable grating 33 is 0V, the movable grating 33 is not displaced, and the fixed electrode 32 and the movable grating 33 are spaced apart by a distance $D_1$ as illustrated in FIG. 3A. On the other hand, when a predetermined voltage, such as a voltage that causes a potential difference between the fixed electrode 32 and the movable grating 33 to be several dozen volts (V), is applied between the fixed electrode 32 and the movable grating 33, the fixed electrode 32 and the movable grating 33 are attracted to each other by an electrostatic attractive force, and the movable grating 33 is displaced toward the fixed electrode 32 as illustrated in FIG. 4. As a result, the movable grating 33 moves toward the fixed electrode 32, and the distance between the movable grating 33 and the fixed electrode 32 becomes distance $D_2$, which is shorter than the distance $D_1$.

In the present embodiment, the grating pattern of the light reflection grating 30 can be altered by changing a combination of voltages applied or changing the voltage applied between the fixed electrodes 32a to 32l and the movable gratings 33a to 33l.

FIG. 3B illustrates an example case where no voltage is applied to the fixed electrodes 32a to 32l and the movable gratings 33a to 33l, such as a case where the applied voltage is 0 V. In this case, the movable gratings 33a to 33l are not displaced, and as such, light incident on the reflective film 34 arranged on the light entering side surface of the movable gratings 33a to 33l is specularly reflected without deviation.

Figure 5A:
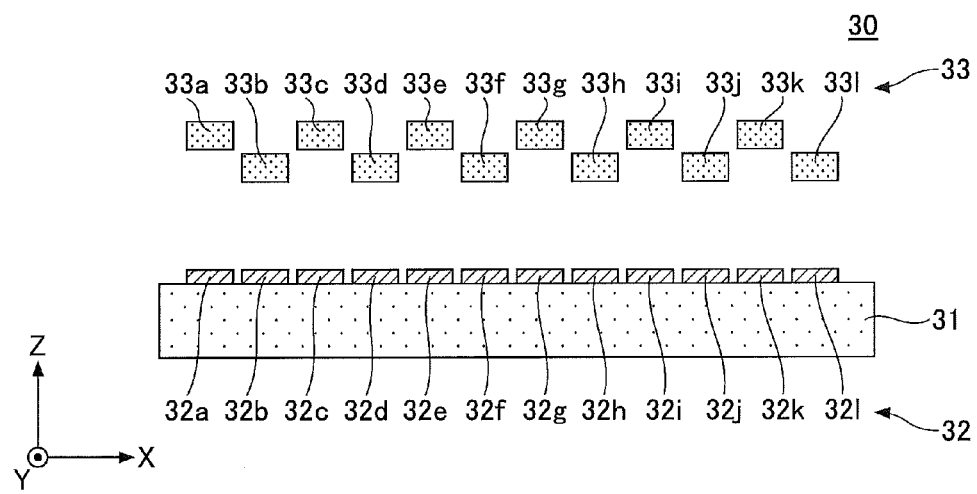
FIGS. 5A and 5B are diagrams illustrating example grating patterns of the light reflection grating according to the first embodiment.

FIG. 5A illustrates an example case where a voltage is alternately applied to every other movable grating 33. That is, a predetermined voltage is applied between the fixed electrode 32b and the movable grating 33b, the fixed electrode 32d and the movable grating 33d, the fixed electrode 32f and the movable grating 33f, the fixed electrode 32h and the movable grating 33h, the fixed electrode 32j and the movable grating 33j, and the fixed electrode 32l and the movable grating 33l. In this case, the grating pattern of the light reflection grating 30 is arranged such that every other movable grating 33, that is, the movable gratings 33b, 33d, 33f, 33h, 33j, and 33l, is displaced downward.

Figure 5B:
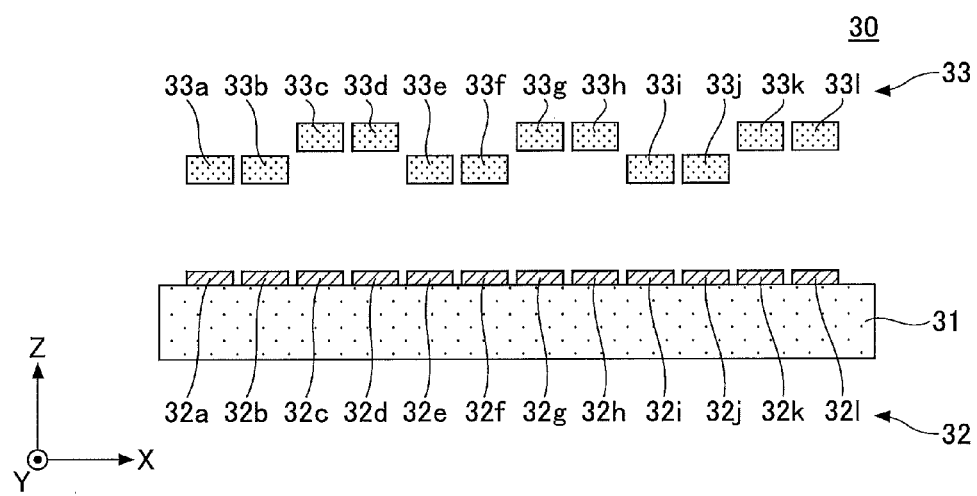

FIG. 5B illustrates an example case where a voltage is alternately applied and not applied to every two adjacent movable gratings 33. That is, a predetermined voltage is applied between the fixed electrode 32a and the movable grating 33a, the fixed electrode 32b and the movable grating 33b, the fixed electrode 32e and the movable grating 33e, the fixed electrode 32f and the movable grating 33f, the fixed electrode 32i and the movable grating 33i, and the fixed electrode 32j and the movable grating 33j. In this case, the grating pattern of the light reflection grating 30 is arranged such that every two movable gratings 33, that is, the movable gratings 33a, 33b, 33e, 33f, 33i, and 33j, are displaced downward.

Figure 6A:
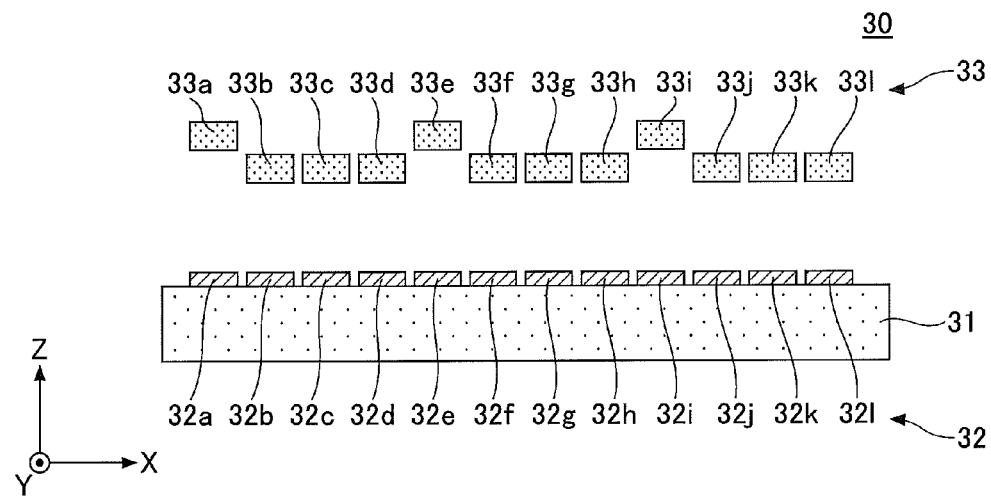
FIGS. 6A and 6B are diagrams illustrating other example grating patterns of the light reflection grating according to the first embodiment.

FIG. 6A illustrates an example case where a voltage is applied between the pairs of fixed electrode 32 and the movable grating 33 other than the pairs of the fixed electrode 32a and the movable grating 33a, the fixed electrode 32e and the movable grating 33e, and the fixed electrode 32i and the movable grating 33i. In this case, the grating pattern of the light reflection grating 30 is arranged such that the movable gratings 33b, 33c, 33d, 33f, 33g, 33h, 33j, 33k, and 33l are displaced downward.

Figure 6B:
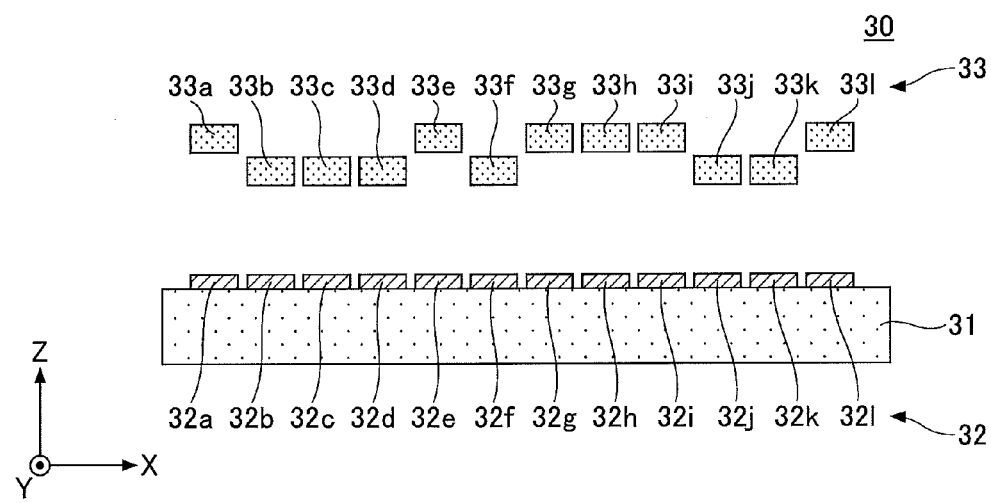

FIG. 6B illustrates an example case where a predetermined voltage is applied between the fixed electrode 32b and the movable grating 33b, the fixed electrode 32c and the movable grating 33c, the fixed electrode 32d and the movable grating 33d, the fixed electrode 32f and the movable grating 33f, the fixed electrode 32j and the movable grating 33j, and the fixed electrode 33k and the movable grating 33k. In this case, the grating pattern of the light reflection grating 30 is arranged such that the movable gratings 33b, 33c, 33d, 33f, 33j, and 33k are displaced downward.

Note that in a given grating pattern of a light reflection grating, the relationship between the voltage V of incident light detected by a light detecting element and the intensities $I\lambda 1$ to $I\lambda n$ of the light at a plurality of different wavelengths $\lambda 1$ to $\lambda n$ can be expressed by the following equation (1). The voltage V detected by the light detecting element corresponds to the light quantity of the light incident on the light detecting element. Also, in the following equation (1), "a1" to "an" represent coefficients that vary depending on the grating pattern of the light reflection grating.

$$V = a1 \times I\lambda 1 + a2 \times I\lambda 2 + \ldots + an \times I\lambda n \quad (1)$$

The storage unit 73 stores the relationship between positions of the movable gratings 33 in each of a plurality of different grating patterns of the light reflection grating 30 and the corresponding coefficients "a1" to "an" for each of the different grating patterns. That is, the storage unit 73 stores the relationship between a voltage based on a light quantity to be detected by the light detecting element 50 and corresponding light intensities at the plurality of different wavelengths for each of the plurality of different grating patterns. The grating control unit 71 of the control unit 70 performs control for altering the grating pattern of the light reflection grating 30 to a different grating pattern. Under control of the grating control unit 71, the movable grating drive power source 60 applies a voltage between corresponding pairs of the fixed electrodes 32a to 32l and the movable gratings 33a to 33l. That is, the grating control unit 71 controls the movable grating drive power source 60 to apply a voltage between predetermined pairs of the fixed electrodes 32a to 32l and the movable gratings 33a to 33l so that the light reflection grating 30 is arranged into one of the grating patterns stored in the storage unit 73.

In the present embodiment, the grating pattern of the light reflection grating 30 is rearranged into n or more different grating patterns, the light detecting element 50 detects voltages V1 to Vn for each of the different grating patterns, and an inverse operation is performed based on a determinant represented by the formula indicated below. In this way, the intensities $I\lambda 1$ to $I\lambda n$ of light at the plurality of different wavelengths $\lambda 1$ to $\lambda n$ can be calculated. Note that in the formula indicated below, "a11" to "ann" represent coefficients. The inverse operation based on the determinant represented by the formula below is performed by the computation unit 72 of the control unit 70.

$$\begin{bmatrix} I\lambda 1 \\ \vdots \\ I\lambda n \end{bmatrix} = \begin{bmatrix} a11 & a12 & \ldots & a1n \\ \vdots & \vdots & & \vdots \\ an1 & an2 & \ldots & ann \end{bmatrix}^{-1} \times \begin{bmatrix} V1 \\ \vdots \\ Vn \end{bmatrix}$$

The spectral measurement device 100 according to the present embodiment can obtain spectral characteristics of incident light based on the intensities $I\lambda 1$ to $I\lambda n$ of light at the wavelengths $\lambda 1$ to $\lambda n$ that have been obtained by the above inverse operation.

In the following, an example spectral measurement method implemented by the spectral measurement device 100 according to the present embodiment will be described with reference to FIG. 7. FIG. 7 is a flowchart illustrating an example spectral measurement method that is controlled by the control unit 70 of the spectral measurement device 100 according to the present embodiment. In the present example, it is assumed that the relationship between 1st to n-th grating patterns and the corresponding coefficients "a11" to "ann" of the above formula representing the determinant is obtained in advance through measurement and/or calculation and stored in the storage unit 73.

In step S102, a variable "i" is set to "1" (i=1).

Then, in step S104, the movable grating drive power source 60 applies a voltage to the movable gratings 33 under control of the grating control unit 71 such that the grating pattern of the light reflection grating 30 is arranged into an i-th grating pattern.

Then, in step S106, a voltage Vi corresponding to the light quantity of light incident on the light detecting element 50 while the light reflection grating 30 is in the i-th grating pattern is obtained. The detected voltage Vi is temporarily stored in the control unit 70.

Then, in step S108, a value obtained by adding 1 to the current value of the variable "i" is set up as a new value for the variable "i".

Then, in step S110, a determination is made as to whether the value of "i" exceeds "n". If the value of "i" exceeds "n", the process proceeds to step S112. If the value of "i" does not exceed "n", the process goes back to step S104 and the processes of steps S104 to S108 are repeated.

Then, in step S112, based on information stored in the storage unit 73 and the voltages V1 to Vn detected by the light detection element 50 for each of the different grating patterns, the computation unit 72 performs the inverse operation based on the determinant represented by the above formula. In this way, the intensities $I\lambda 1$ to $I\lambda n$ of light at the wavelengths $\lambda 1$ to $\lambda n$ can be obtained, and the spectral characteristics of the incident light can be obtained.

According to an aspect of the present embodiment, the number of movable gratings 33 may be increased to thereby increase the wavelength resolution, for example. Further, the light reflection grating 30 may be rearranged into more than n different grating patterns, and the light detecting element 50 may detect the light quantity for each of the different grating patterns. In this way, accuracy of the obtained light spectrum may be further improved, for example.

Figure 8A:
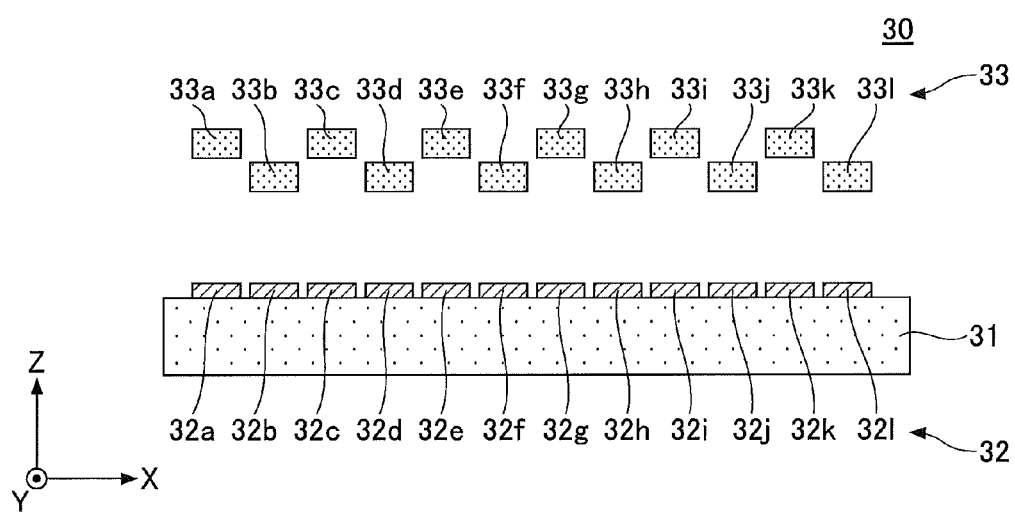
FIGS. 8A-8C are diagrams illustrating other example grating patterns of the light reflection grating according to the first embodiment.
Figure 8B:
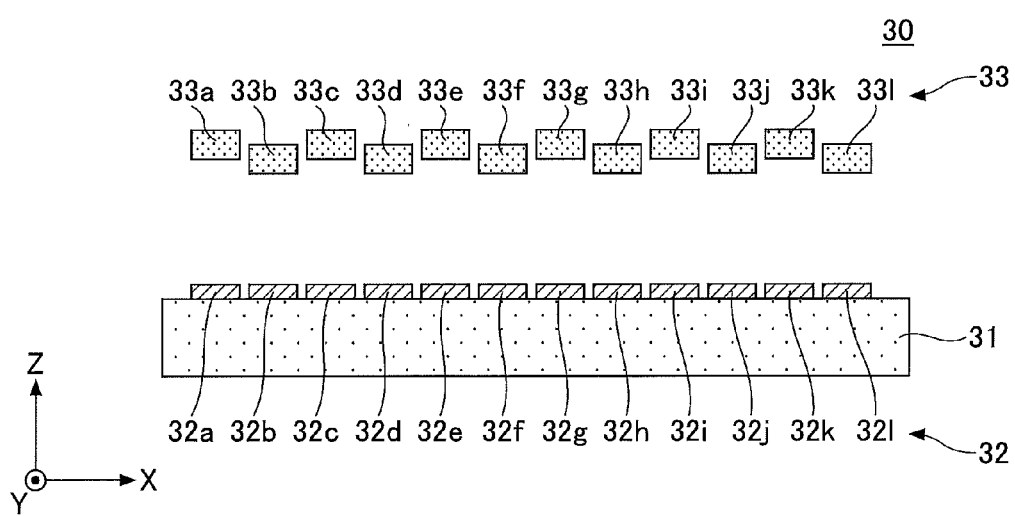
Figure 8C:
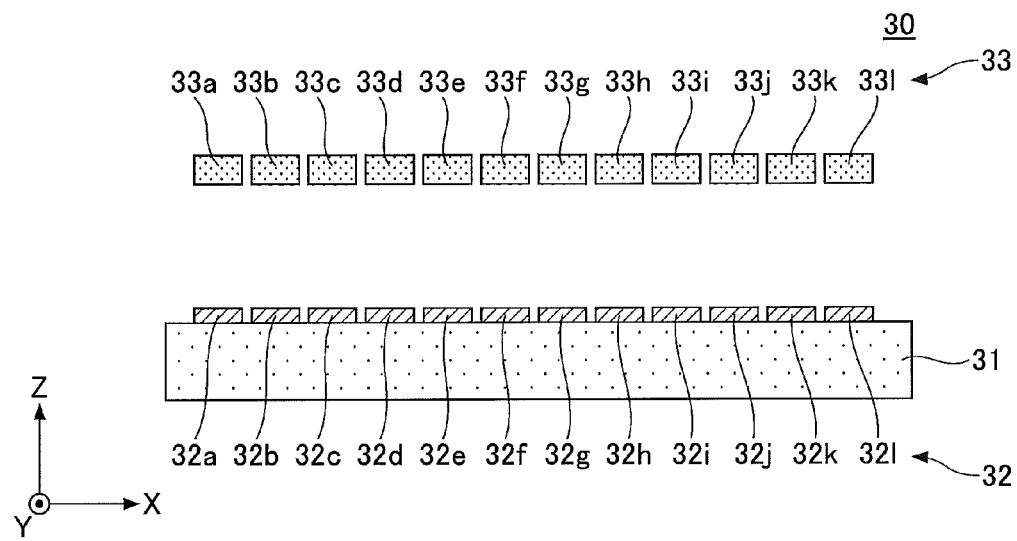

Note that in the example described above, the light reflection grating 30 is arranged into n different grating patterns. However, in other examples of the present embodiment, the amount of displacement of the movable gratings 33 may be varied while the light reflection grating 30 is in the same grating displacement pattern. Specifically, for example, the light reflection grating 30 may be arranged such that every other movable grating 33 is displaced downward. In such a state, the amount of displacement of the displaced movable grating 33 may be increased as illustrated in FIG. 8A, or the amount of displacement of the displaced movable gratings 33 may be decreased as illustrated in FIG. 8B, and the light detecting element 50 may measure the light quantity of incident light for each variation in the amount of displacement of the movable gratings 33. For example, displacement of the movable gratings 33 may be controlled to be in n different amounts of displacement, the light detecting element 50 may detect voltages V1 to Vn for the respective amounts of displacement, and an inverse operation may be performed using the determinant represented by a formula similar to the above formula but with different coefficients. In this way, the intensities $I\lambda 1$ to $I\lambda n$ of light at wavelengths $\lambda 1$ to $\lambda n$ may be calculated. Note that FIG. 8C illustrates an example case where no voltage is applied between the fixed electrodes 32 and the movable gratings 33.

Figure 9A:
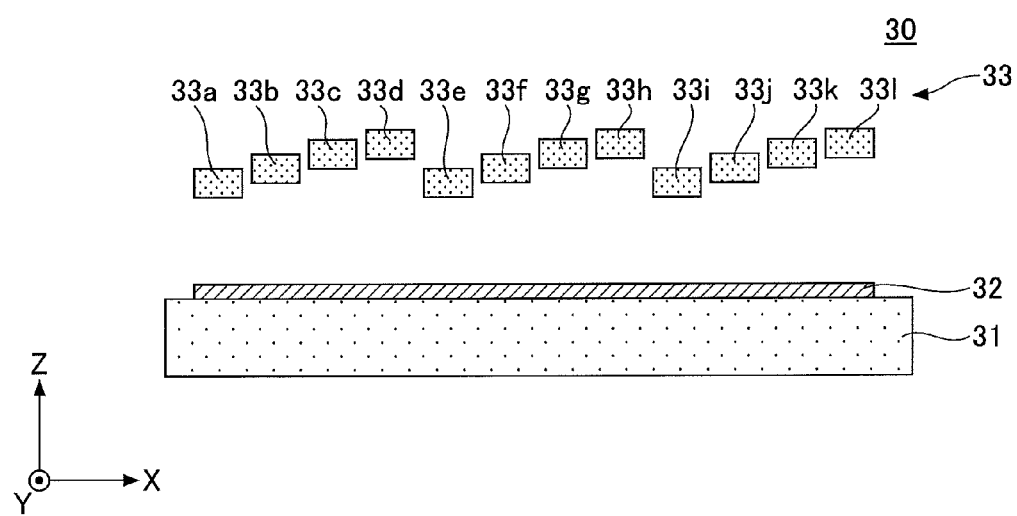
FIGS. 9A-9C are diagrams illustrating an alternative configuration of the light reflection grating according to the first embodiment.
Figure 9B:
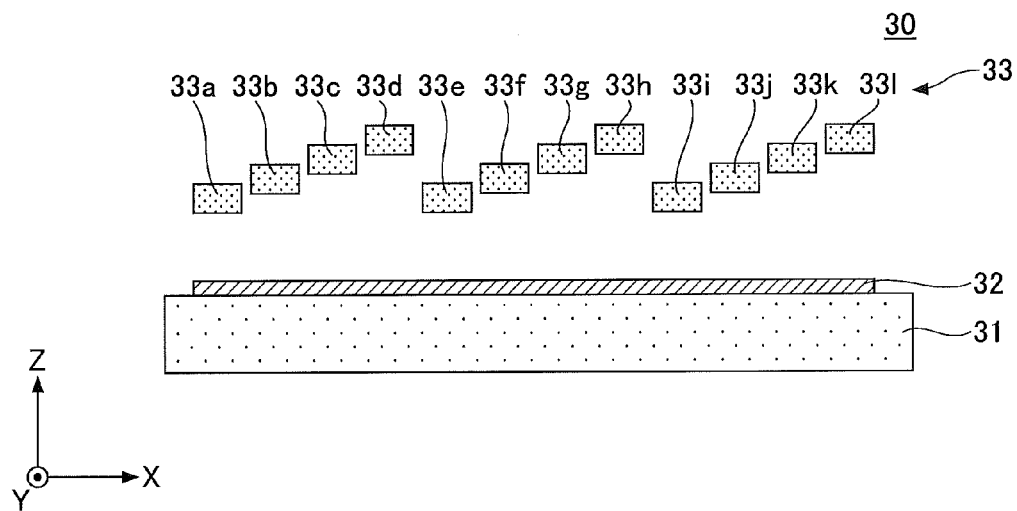
Figure 9C:
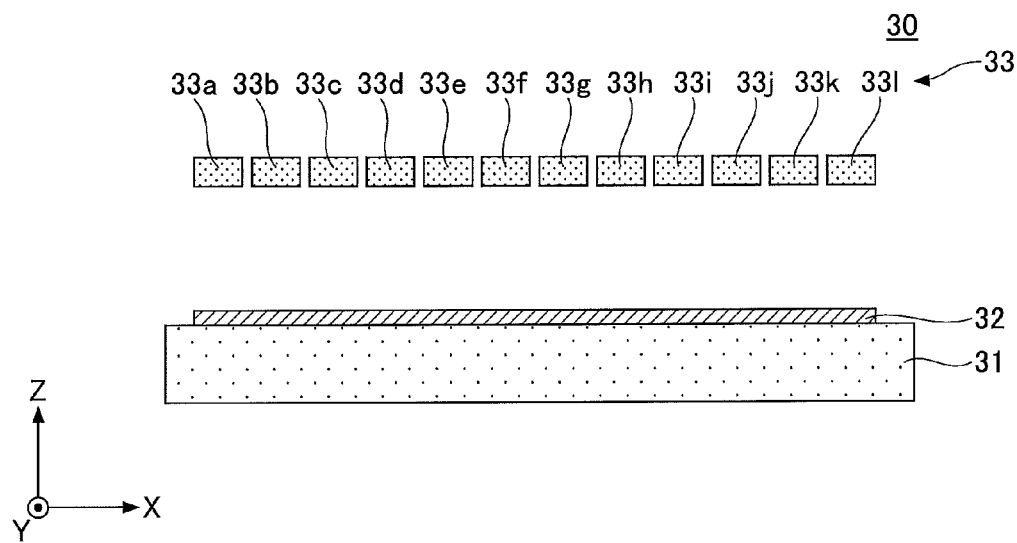

Also, the light reflection grating 30 of the spectral measurement device 100 according to the present embodiment may have an alternative configuration as illustrated in FIGS. 9A-9C in which one common fixed electrode 32 is provided in place of the plurality of fixed electrodes 32a to 32l on the bottom surface 31b of the recess 31a of the substrate 31. Even with such a configuration, a desired grating pattern of the light reflection grating 30 can be obtained by controlling the potential of the fixed electrode 32 to be constant and varying the voltage applied to each of the movable gratings 33a to 33l. FIG. 9A illustrates an example case where the movable gratings 33 are displaced in four different amounts of displacement. Specifically, a voltage V1 is applied between the fixed electrode 32 and the movable gratings 33a, 33e, and 33i. A voltage V2 is applied between the fixed electrode 32 and the movable gratings 33b, 33f, and 33j. A voltage V3 is applied between the fixed electrode 32 and the movable gratings 33c, 33g, and 33k. A voltage V4 is applied between the fixed electrode 32 and the movable gratings 33d, 33h, and 33l. Note that the voltages V1 to V4 have the following relationship: V1>V2>V3>V4. FIG. 9B illustrates an example case where the voltages V1 to V4 are increased while maintaining the relationship V1>V2>V3>V4. FIG. 9C illustrates an example case where no voltage is applied between the fixed electrode 32 and the movable grating 33.

Figure 10:
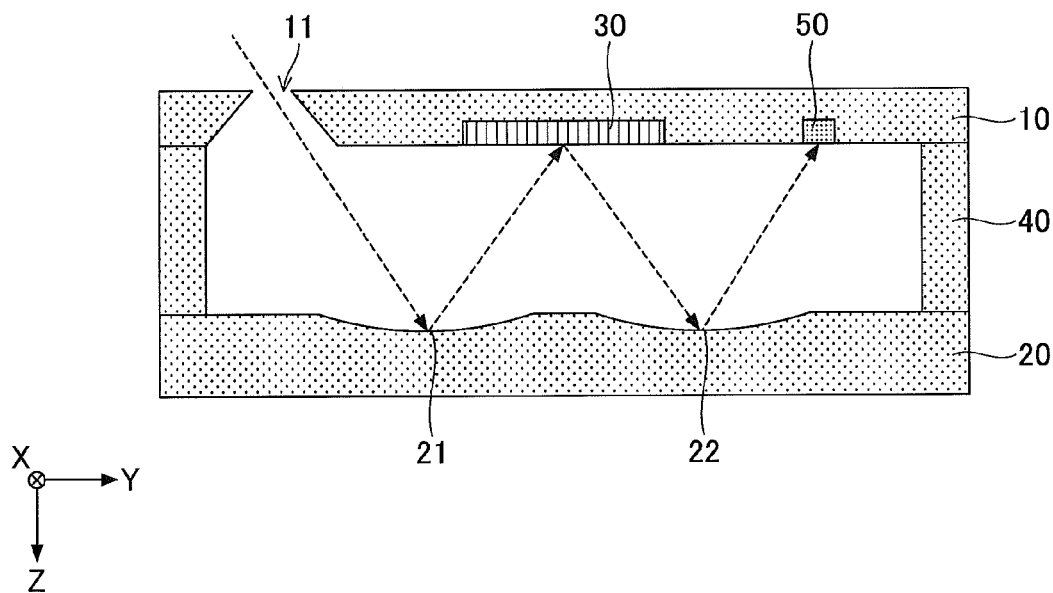
FIG. 10 is a diagram illustrating an alternative configuration of the spectral measurement device according to the first embodiment.

Further, the spectrum measurement device 100 according to the present embodiment may have an alternative configuration as illustrated in FIG. 10 in which the light detecting element 50 is arranged in the first substrate 10 on one surface of the first substrate 10. In this case, the light exit portion 12 does not have to be provided in the first substrate 10. The light detecting element 50 is arranged at a position where light incident through the light entrance portion 11 and reflected by the first concave light reflecting portion 21, the light reflection grating 30, and the second concave light reflecting portion 22 is brought into focus. By forming the light detecting element 50 within the first substrate 10 on one surface of the first substrate 10, further miniaturization of the spectral measurement device may be achieved. Also, assembly of the spectral measurement device may be simplified as compared with the configuration in which the light detecting element 50 is provided outside, and in this way, manufacturing costs can be reduced. Note that in a case where the light detecting element 50 is a Si photodiode, for example, the light detecting element 50 may be formed by a CMOS process using a Si substrate or an SOI (Silicon on Insulator) substrate.

In the spectral measurement device 100 according to an aspect of the present embodiment, the light detecting element 50 is configured to detect the light quantity of incident light for each of a plurality of grating patterns in which one or more of the movable gratings 33 forming the light reflection grating 30 are displaced, and the light intensities of the light at various wavelengths are calculated based on the detected light quantity. With such a configuration, the light reflecting grating 30 does not have to be rotated, and as such, the spectral measurement device 100 may be miniaturized and manufactured at a relatively low cost, for example. Further, because no drive system for rotating the light reflection grating 30 has to be provided, reliability of the spectral measurement device 100 may be improved, for example.

Second Embodiment

Figure 11A:
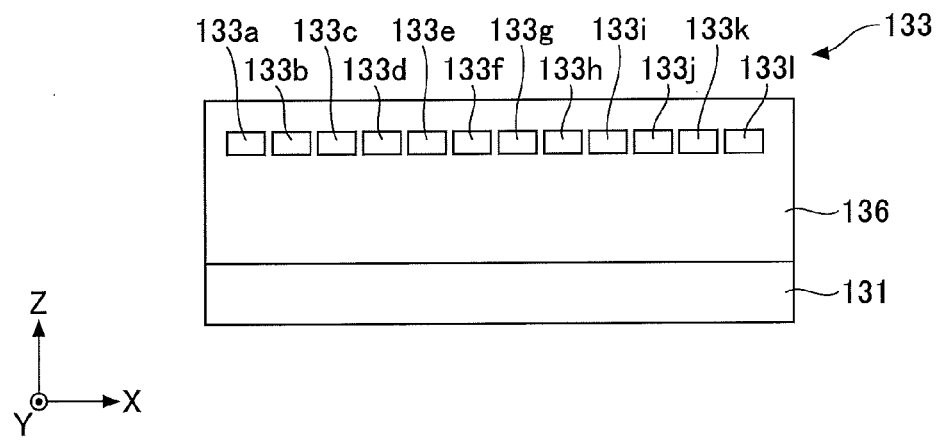
FIGS. 11A-11C are diagrams illustrating an example configuration of a light reflection grating according to a second embodiment of the present invention.
Figure 11B:
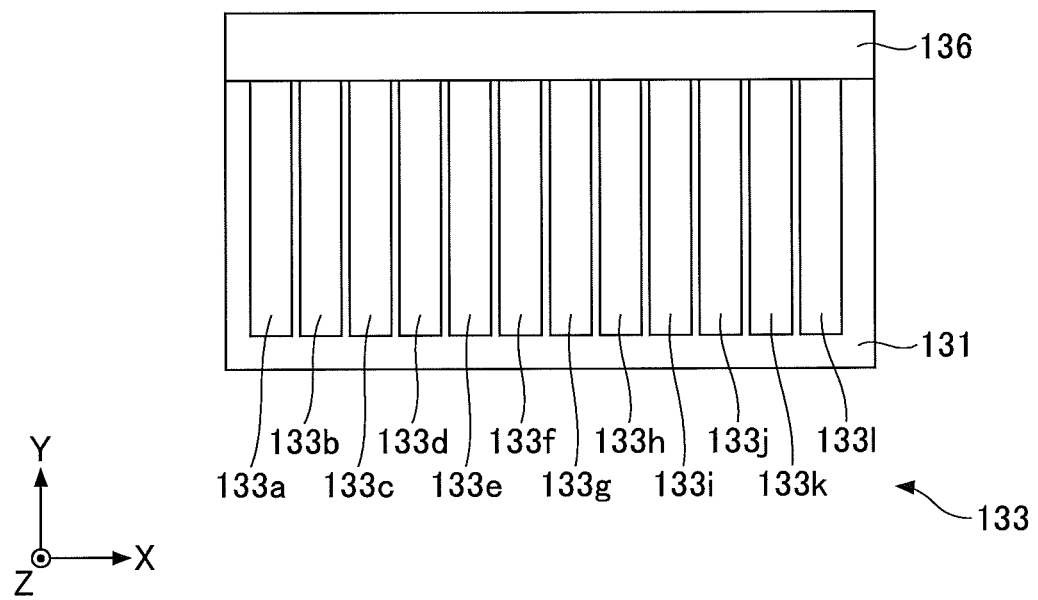
Figure 11C:
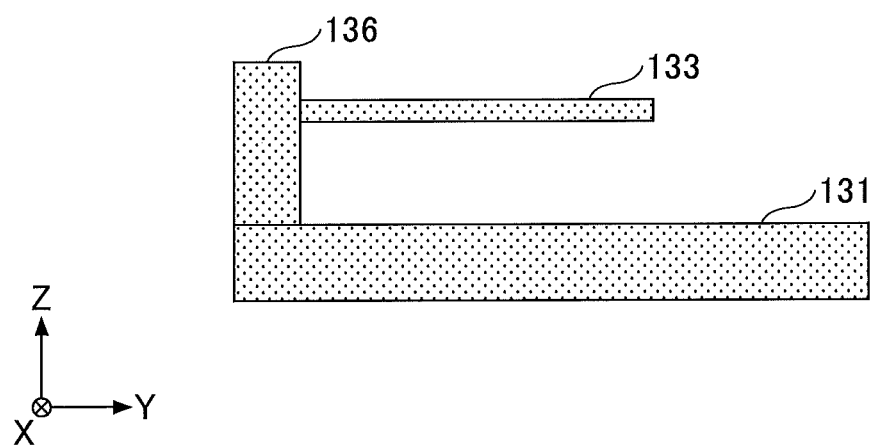

In the following, a second embodiment of the present invention will be described. In the second embodiment, a movable grating forming a light reflection grating is supported not by two ends but by one end to have a cantilever configuration. Specifically, as illustrated in FIGS. 11A-11C, a fixing support portion 136 is provided on a substrate 131, and one end of each of the movable gratings 133a to 133l is supported by the fixing support portion 136. Note that in the following description of the present embodiment, the movable gratings 133a to 133l may simply be referred to as "movable grating 133". FIG. 11A is a front view of the light reflection grating according to the embodiment, FIG. 11B is a top view, and FIG. 11C is a side view of the same.

Figure 12A:
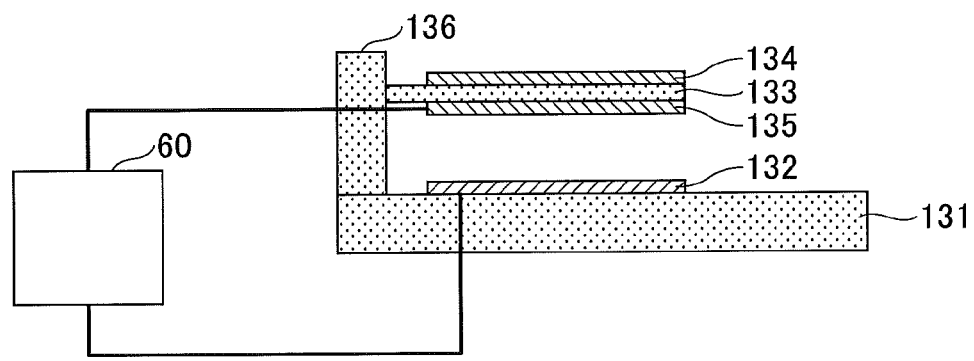
FIGS. 12A and 12B are diagrams illustrating an example operation of the light reflection grating according to the second embodiment.
Figure 12B:
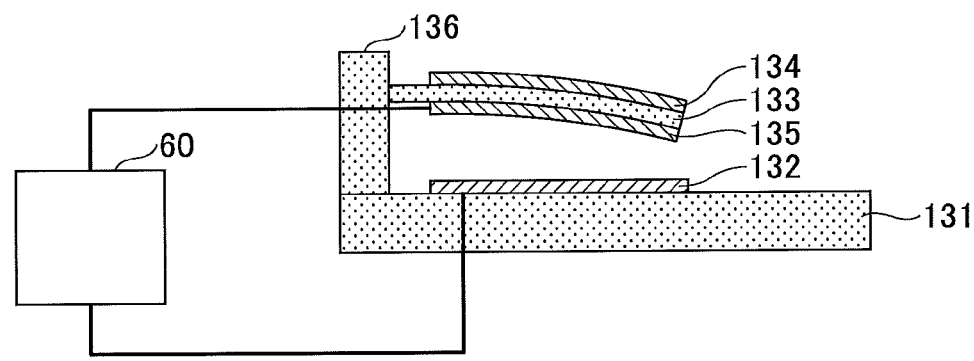

FIGS. 12A and 12B illustrate a more detailed configuration of the light reflection grating according to the present embodiment. As illustrated in FIGS. 12A and 12B, the light reflection grating according to the present embodiment includes a fixed electrode 132 formed on one surface of the substrate 131. A movable grating electrode 135 is formed on one surface of the movable grating 133, and a reflective film 134 made of a metal material is formed on the other surface of the movable grating 133. Note that the fixed electrode 132, the reflective film 134, and the movable grating electrode 135 are omitted from the illustrations of FIGS. 11A-11C for the sake of convenience.

The fixed electrode 132 formed on one surface of the substrate 131 and the movable grating electrode 135 formed on one surface of the movable grating 133 face each other, and the movable grating drive power supply 60 is connected to the fixed electrode 132 and the movable grating electrode 135. In this way, the movable grating drive power supply 60 can apply a voltage between the fixed electrode 132 and the movable grating electrode 135.

In the present embodiment, a predetermined voltage is applied between the fixed electrode 132 and the movable grid electrode 135 by the movable grid drive power source 60. As a result, an electrostatic attractive force acts between the fixed electrode 132 and the movable grating electrode 135, and the movable grating 133 having the movable grating electrode 135 formed thereon is deformed and displaced toward the fixed electrode 132 as illustrated in FIG. 12B from the position as illustrated in FIG. 12A.

Figure 13:
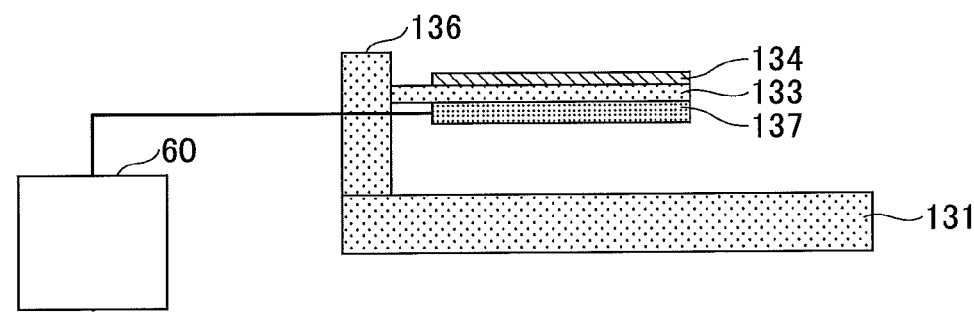
FIG. 13 is a diagram illustrating an alternative configuration of the light reflection grating according to the second embodiment.

FIG. 13 illustrates an alternative configuration of the light reflection grating according to the present embodiment in which a piezoelectric element 137 that is interposed between electrodes is provided on the other surface of the movable grating 133. With such a configuration, the fixed electrode 132 does not have to be formed on the substrate 131. In yet another alternative configuration, the movable grating 133 may be made of a piezoelectric material, and an electrode may be provided on the other surface (back surface) of the movable grating 133, for example.

The light reflection grating according to the second embodiment can be used in place of the light reflecting grating 30 according to the first embodiment in the spectral measurement device 100 illustrated in FIG. 2 or FIG. 10, for example. Note that features of the light reflection grating according to the second embodiment other than those described above may be substantially identical to the first embodiment.

Third Embodiment

In the following, a spectral measurement device 300 according to a third embodiment of the present invention will be described with reference to FIG. 14.

Figure 14:
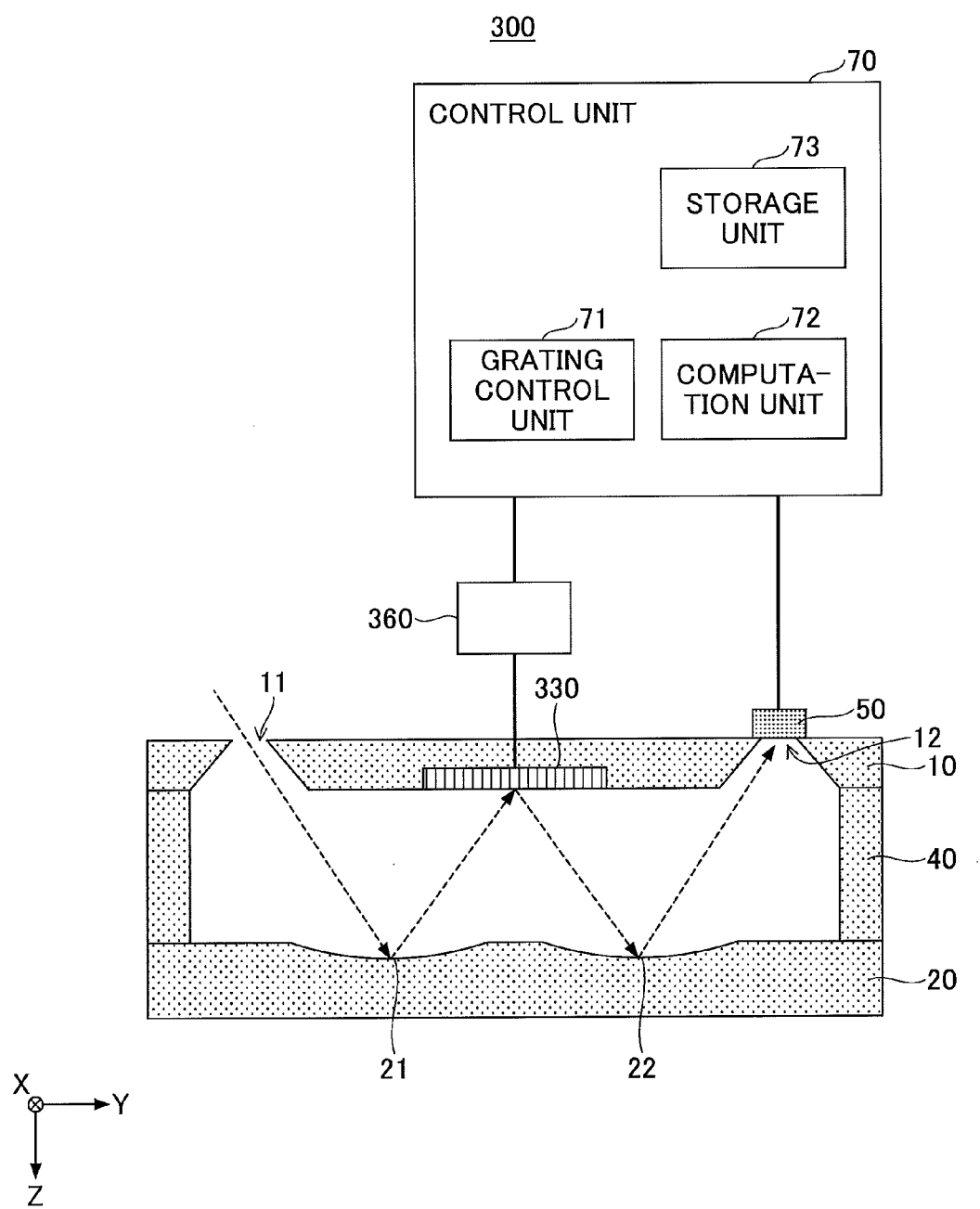
FIG. 14 is a diagram illustrating an example configuration of a spectral measurement device according to a third embodiment of the present invention.

As illustrated in FIG. 14, the spectral measurement device 300 according to the present embodiment includes the first substrate 10 and the second substrate 20. The first substrate 10 is provided with the light entrance portion 11 and the light exit portion 12 that penetrate from one surface to the other surface of the first substrate 10. A light reflection grating 330 is provided between the light entrance portion 11 and the light exit portion 12 on one surface of the first substrate 10. The second substrate 20 has the first concave surface light reflecting portion 21 and the second concave surface light reflecting portion 22 provided on one surface. The light detecting element 50 is arranged on the other side of the first substrate 10 at a position where the light exit portion 12 is formed. The light detecting element 50 may be a single pixel photodiode chip made of Si, Ge, or InGaAs, for example.

In the present embodiment, a movable beam drive power source 360 as a movable beam drive unit is connected to the light reflection grating 330, and the control unit 70 is connected to the movable beam drive power source 360 and the light detecting element 50. The control unit 70 includes the grating control unit 71, the computation unit 72, and the storage unit 73.

Note that the broken line arrows illustrated in FIG. 14 represent an optical path of light incident into the light entrance portion 11. In the spectral measurement device 300 according to the present embodiment, light incident through the light entrance portion 11 is reflected by the first concave light reflecting portion 21 of the second substrate 20, incident on the light reflection grating 330 formed on the first substrate 10, and reflected by the light reflection grating 330. The light reflected by the light reflection grating 330 is reflected by the second concave light reflecting portion 22 of the second substrate 20 to be focused by the light exit portion 12 of the first substrate 10 to form an image. The light focused in this manner is detected by the light detecting element 50.

The first substrate 10 and the second substrate 20 are arranged such that one surface of the first substrate 10 and one surface of the second substrate 20 face each other. The spacer 40 is provided between the first substrate 10 and the second substrate 20 to fix the first substrate 10 and the second substrate 20 in place. Also, when fixing the first substrate 10 and the second substrate 20 in place with the spacer 40, the position of the first substrate 10 and the second substrate 20 are adjusted to be in a desired position.

Note that a spectral measurement device according to the present embodiment is not limited to the wafer-level spectral measurement device 300 as illustrated in FIG. 14 as long as it includes a light reflection grating as described below. Also, although the light entrance portion 11 and the light exit portion 12 are formed in the first substrate 10 in the spectral measurement device 300 of FIG. 14, in other examples, slits forming a light entrance portion and a light exit portion may be separately provided as separate elements from the first substrate 10, for example.

(Light Reflection Grating)

Figure 15A:
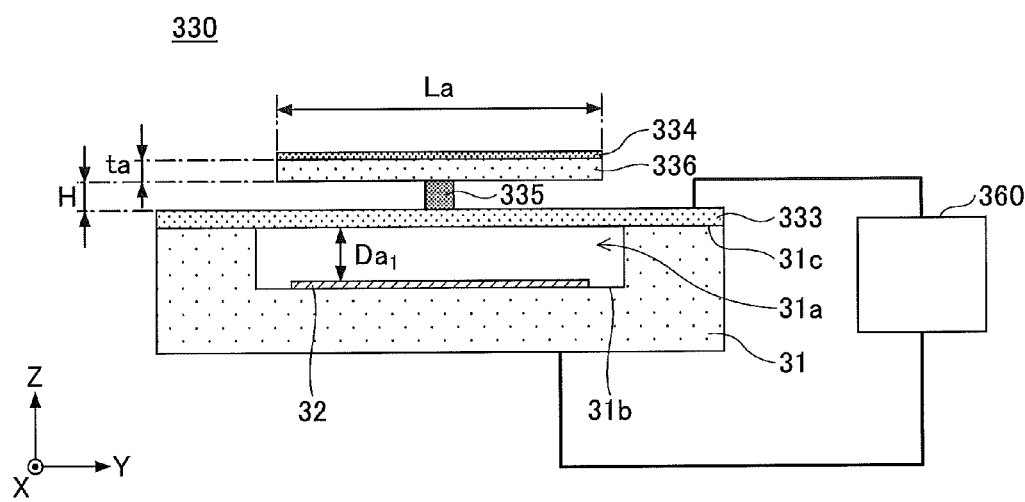
FIGS. 15A and 15B are diagrams illustrating an example configuration of a light reflection grating according to the third embodiment.
Figure 15B:
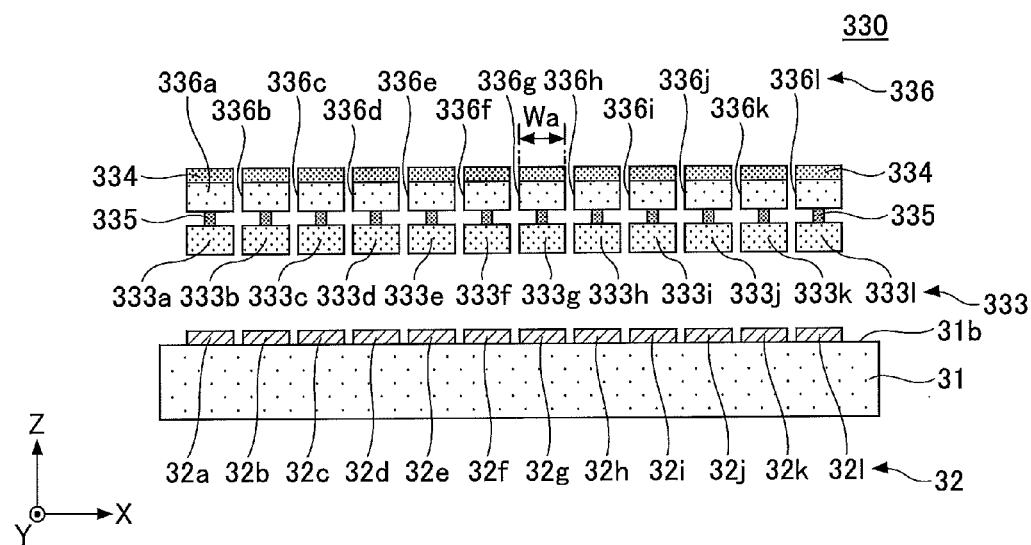

In the following, the light reflection grating 330 according to the third embodiment will be described with reference to FIGS. 15A and 15B. FIG. 15A is a cross-sectional view across the longitudinal direction of a grating forming the light reflection grating 330 according to the present embodiment, and FIG. 15B is a cross sectional view across the lateral direction perpendicular to the longitudinal direction of the light reflection grating 330. Note that in the figures illustrating the light reflection grating 330 according to the present embodiment, direction X represents the lateral direction of the light reflection grating 330, direction Y represents the longitudinal direction of the light reflection grating 330, and direction Z represents a direction perpendicular to direction X and direction Y.

Also, in the following descriptions of the present embodiment, the plurality of fixed electrodes 32a to 32l may generically be referred to as "fixed electrode 32", a plurality of movable beams 333a to 333l may generically be referred to as "movable beam 333", and a plurality of gratings 336a to 336l may generically be referred to as "grating 336". Also, note that although an example of the present embodiment in which twelve fixed electrodes 32a to 32l and twelve movable beams 333a to 333l are provided will be described below, the number of fixed electrodes 32 and the number of movable beams 333 provided in the light reflection grating 330 according to the present embodiment is not limited to twelve.

The light reflection grating 330 according to the present embodiment includes the substrate 31 having a recess 31a formed therein and a plurality of fixed electrodes 32a to 32l formed on the bottom surface 31b of the recess 31a. The light reflection grating 330 also has a plurality of movable beams 333a to 333l formed on the upper surface 31c of the outer edge of the substrate 31 surrounding the recess 31a so as to cover the recess 31a. The plurality of fixed electrodes 32a to 32l and the plurality of movable beams 333a to 333l are arranged to extend the same length in the longitudinal direction and are arranged side by side in the lateral direction.

As illustrated in FIG. 15A, the two longitudinal direction side ends of each of the plurality of movable beams 333a to 333l are supported on the upper surface 31c of the outer edge of the substrate 31 surrounding the recess 31a. That is, the movable beams 333 have a doubly supported beam configuration. In the present embodiment, the depth of the recess 31a formed in the substrate 31 may be 10 μm to 100 μm, and the length of the fixed electrodes 32 in the longitudinal direction may be 100 μm to 3 mm, for example. Also, the width Wa of the fixed electrodes 32 and the movable beams 333 in the lateral direction may be 1 μm to 10 μm, and the thickness of the movable beams 333 may be 1 μm to 10 μm, for example.

In the present embodiment, the fixed electrode 32 and the movable beam 333 that form a pair are arranged to face each other. That is, the fixed electrodes 32a to 32l are respectively arranged to face the movable beams 333a to 333l. Specifically, the fixed electrode 32a and the movable beam 333a, the fixed electrode 32b and the movable beam 333b, the fixed electrode 32c and the movable beam 333c, the fixed electrode 32d and the movable beam 333d, the fixed electrode 32e and the movable beam 333e, the fixed electrode 32f and the movable beam 333f are arranged to face each other. Further, the fixed electrode 32g and the movable beam 333g, the fixed electrode 32h and the movable beam 333h, the fixed electrode 32i and the movable beam 333i, the fixed electrode 32j and the movable beam 333j, the fixed electrode 32k and the movable beam 333k, the fixed electrode 32l and the movable beam 333l are arranged to face each other. More specifically, the fixed electrodes 32a to 32l and the movable beams 333a to 333l are arranged such that one surface of each of the fixed electrodes 32a to 32l faces one surface of the corresponding movable beams 333a to 333l.

Further, as illustrated in FIG. 15A, the gratings 336a to 336l are respectively provided on the other side of the movable beams 333a to 333l opposite the side of the movable beams 333a to 333l facing the fixed electrodes 32a to 32l. Specifically, the grating 336a is arranged on the movable beam 333a, the grating 336b is arranged on the movable beam 333b, the grating 336c is arranged on the movable beam 333c, the grating 336d is arranged on the movable beam 333d, the grating 336e is arranged on the movable beam 333e, and the grating 336f is arranged on the movable beam 333f. Further, the grating 336g is arranged on the movable beam 333g, the grating 336h is arranged on the movable beam 333h, the grating 336i is arranged on the movable beam 333i, the grating 336j is arranged on the movable beam 333j, the grating 336k is arranged on the movable beam 333k, and the grating 336l is arranged on the movable beam 333l. Note that in the following descriptions, the movable beams 333a to 333l may also be referred to as movable portion, and the gratings 336a to 336l may also be referred to as grating portion.

The movable beam 333 and the grating 336 are fixed to each other by a connecting member 335. That is, one surface of each of the gratings 336a to 336l and the other surface of the corresponding movable beams 333a to 333l are fixed to the connecting member 335. The connecting member 335 is arranged at a position of the grating 336 that would be disposed parallel to the fixed electrode 32 even when the movable beam 333 is displaced. Preferably, the connecting member 335 is arranged close to the center of gravity of each of the movable beam 333 and the grating 336. The height H of the connecting member 335 may be 1 μm to 30 μm, for example. The width of the grating 336 in the lateral direction may be approximately 1 μm to 10 μm, which is approximately the same as the width Wa of the movable beam 333, and the thickness to of the grating 336 may be 1 μm to 10 μm, for example. Further, the length La of the grating 336 in the longitudinal direction may be 100 μm to 3 mm, for example. Note that the length La of the grating 336 in the longitudinal direction and the height H of the connecting member 335 are determined so as not to interfere with other components when the movable beam 333 is displaced. In particular, the height H of the connecting member 335 is used as an adjustment factor.

The substrate 31 may be made of an insulator or a semiconductor such as Si, for example. The light reflection grating 330 according to the present embodiment may be formed on one surface of the first substrate 10 or on a substrate other than the first substrate 10. In the case where the light reflection grating 330 according to the present embodiment is formed on one surface of the first substrate 10, the first substrate 10 can be used as the substrate 31 of the light reflection grating 330, and in this way, miniaturization and cost reduction of the spectral measurement device 300 can be achieved, for example. In the case where the substrate 31 is made of a semiconductor, an insulating film is formed on the bottom surface 31b of the recess 31a of the substrate 31, and the fixed electrodes 32a to 32l are formed on the insulating film. Further, an insulating film is formed on the upper surface 31c of the substrate 31, and the movable beams 333a to 333l are formed on the insulating film. Further, in some examples, an insulating film may be formed on the entire surface of the substrate 31 that is exposed within the recess 31a.

Each of the fixed electrodes 32a to 32l is made of an electrode material used in various semiconductor devices, such as Al, Pt, Au, or some other conductive metal material, for example. Also, each of the movable beams 333a to 333l is made of a conductive metal material or a semiconductor material. A reflection film 334 for reflecting light is formed on the other surface of each of the gratings 336a to 336l opposite the one surface connected to the connecting member 335. The reflection film 334 is a metal film that may be made of aluminum, silver, gold or the like according to the wavelength of light to be spectrally analyzed.

In the present embodiment, a movable beam drive power source 360 is connected to the fixed electrodes 32a to 32l and the movable beams 333a to 333l so that the movable beam drive power source 360 can apply a voltage between corresponding pairs of the fixed electrodes 32a to 32l and the movable beams 333a to 333l.

Figure 16:
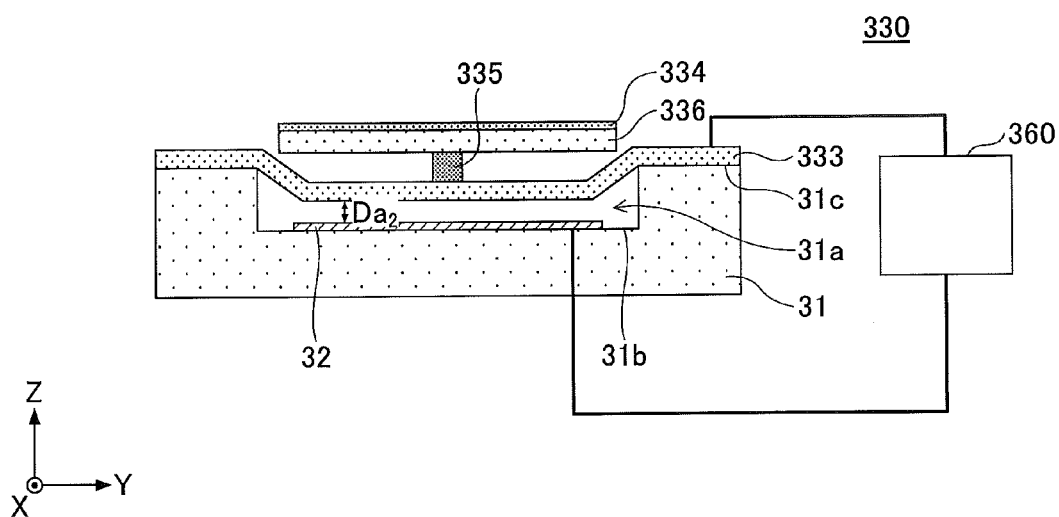
FIG. 16 is a diagram illustrating an example operation of the light reflection grating according to the third embodiment.

When the potential difference between the fixed electrode 32 and the movable beam 333 is 0 V, the movable beam 333 is not displaced, and the fixed electrode 32 and the movable beam 333 are separated by a distance $Da_1$ as illustrated in FIG. 15A. On the other hand, when a predetermined voltage, such as a voltage that causes the potential difference between the fixed electrode 32 and the movable beam 333 to be several dozen volts (V), is applied between the fixed electrode 32 and the movable beam 333, the fixed electrode 32 and the movable beam 333 are attracted to each other by an electrostatic attractive force such that the movable beam 333 is displaced toward the fixed electrode 32 as illustrated in FIG. 16. That is, the movable beam 333 comes closer to the fixed electrode 32, and the distance between the movable beam 333 and the fixed electrode 32 becomes distance $Da_2$, which is shorter than the distance $Da_1$. In the present embodiment, the grating pattern of the light reflection grating 330 may be rearranged into various grating patterns by changing a combination of voltages applied or changing the voltage applied between the fixed electrodes 32a to 32l and the movable beams 333a to 333l.

FIG. 15B illustrates an example case where no voltage is applied to the fixed electrodes 32a to 32l and the movable beams 333a to 333l, such as a case where the applied voltage is 0 V. In this case, the movable beams 333a to 333l are not displaced, and light incident on the reflection film 334 arranged on the light entering surface side of the movable beams 333a to 333l is specularly reflected by the reflection film 334.

Figure 17A:
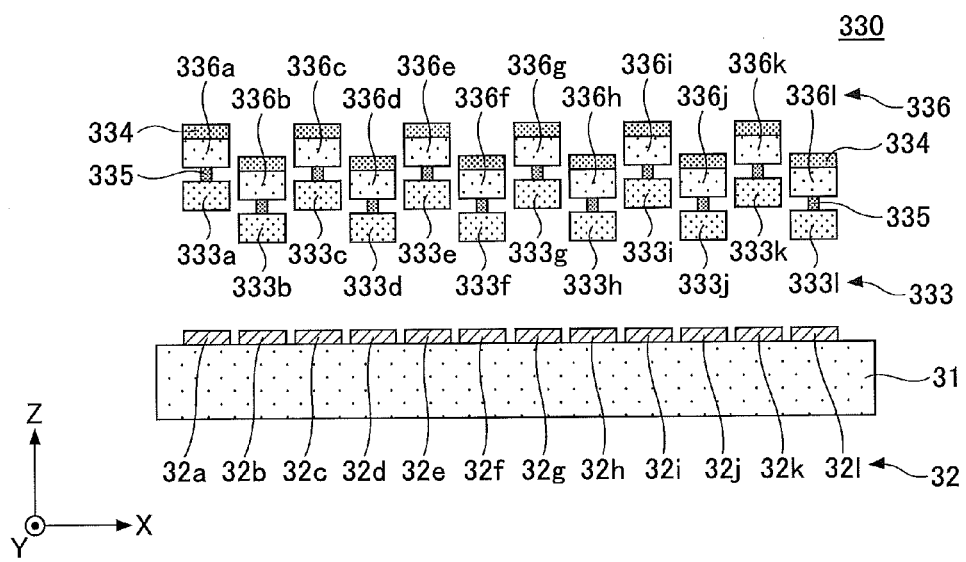
FIGS. 17A and 17B are diagrams illustrating example grating patterns of the light reflection grating according to the third embodiment.

FIG. 17A illustrates an example case where voltages are alternately applied to the movable beams 333. That is, a predetermined voltage is applied between the fixed electrode 32b and the movable beam 333b, the fixed electrode 32d and the movable beam 333d, the fixed electrode 32f and the movable beam 333f, the fixed electrode 32h and the movable beam 333h, the fixed electrode 32j and the movable beam 333j, and the fixed electrode 32l and the movable beam 333l. In this case, the light reflection grating 330 is arranged into a grating pattern in which every other movable beam 333, namely, the movable beams 333b, 333d, 333f, 333h, 333j, and 333l, are displaced downward, and the corresponding gratings 336b, 336d, 336f, 336h, 336j, and 336l are also displaced downward along with the movable beams 333b, 333d, 333f, 333h, 333j, and 333l.

Figure 17B:
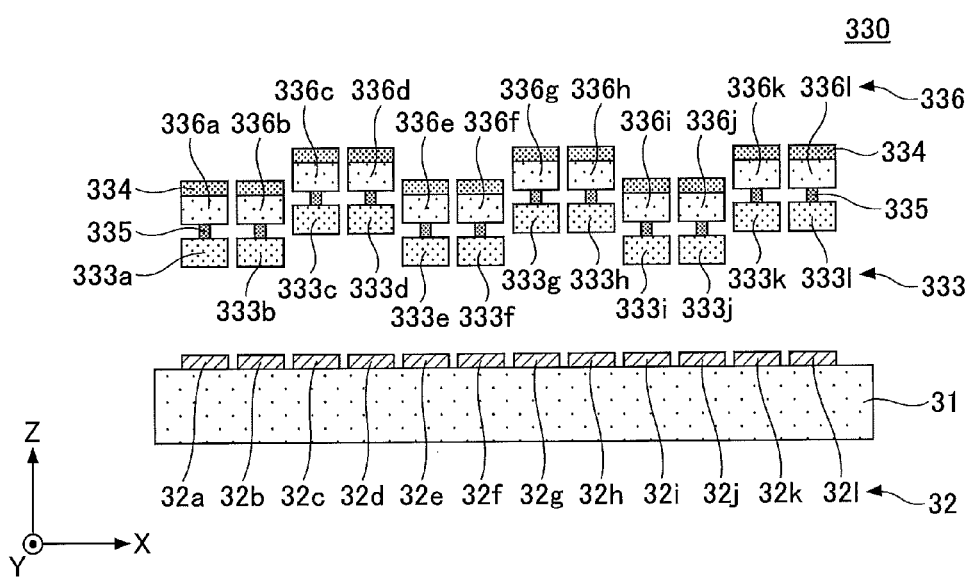

FIG. 17B illustrates an example case where a voltage is alternately applied and not applied to every two adjacent movable beams 333. That is, a predetermined voltage is applied between the fixed electrode 32a and the movable beam 333a, the fixed electrode 32b and the movable beam 333b, the fixed electrode 32e and the movable beam 333e, the fixed electrode 32f and the movable beam 333f, the fixed electrode 32i and the movable beam 333i, and the fixed electrode 32j and the movable beam 333j. In this case, the light reflection grating 330 is arranged into a grating pattern in which every two movable beams 333, namely, the movable beams 333a, 333b, 333e, 333f, 333i, and 333j, are displaced downward, and the corresponding gratings 336a, 336b, 336e, 336f, 336i, and 336j are also displaced downward along with the movable beams 333a, 333b, 333e, 333f, 333i, and 333j.

Figure 18A:
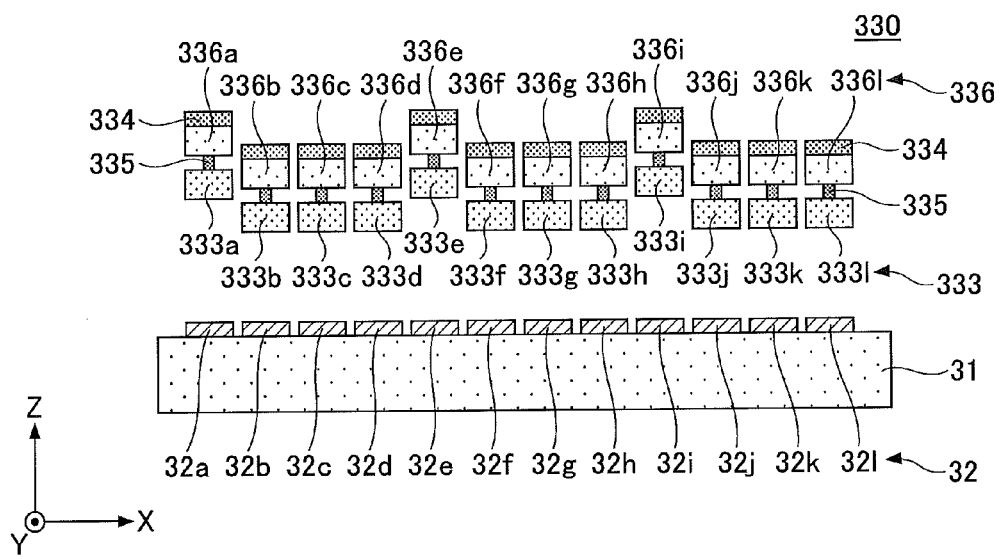
FIGS. 18A and 18B are diagrams illustrating other grating patterns of the light reflection grating according to the third embodiment.

FIG. 18A illustrates an example case where a voltage is applied between corresponding pairs of the fixed electrode 32 and the movable beam 33 other than the pairs of the fixed electrode 32a and the movable beam 333a, the fixed electrode 32e and the movable beam 333e, and the fixed electrode 32i and the movable beam 333i. In this case, the light reflection grating 330 is arranged into a grating pattern in which the movable beams 333b, 333c, 333d, 333f, 333g, 333h, 333j, 333k, and 333l are displaced downward, and the corresponding gratings 336b, 336c, 336d, 336f, 336g, 336h, 336j, 336k, and 336l are also displaced downward along with the movable beams 333b, 333c, 333d, 333f, 333g, 333h, 333j, 333k, and 333l.

Figure 18B:
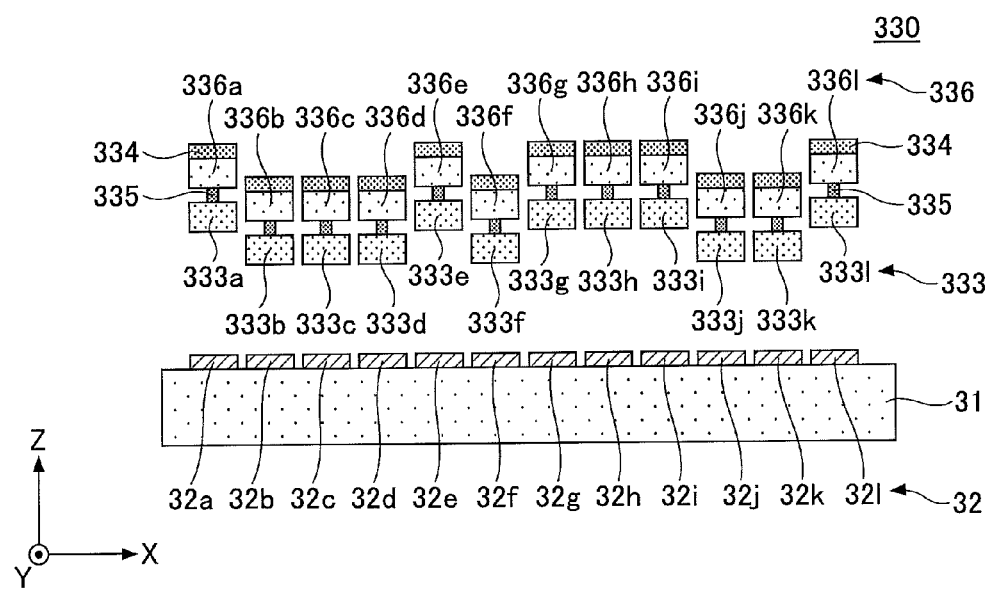

FIG. 18B illustrates an example case where a voltage is applied between the fixed electrode 32b and the movable beam 333b, the fixed electrode 32c and the movable beam 333c, the fixed electrode 32d and the movable beam 333d, the fixed electrode 32f and the movable beam 333f, the fixed electrode 32j and the movable beam 333j, and the fixed electrode 32k and the movable beam 333k. In this case, the light reflection grating 330 is arranged into a grating pattern in which the movable beams 333b, 333c, 333d, 333f, 333j, and 333k are displaced downward, and the corresponding gratings 336b, 336c, 336d, 336f, 336j, and 336k are displaced downward along with the movable beams 333b, 333c, 333d, 333f, 333j, and 333k.

As described above, in a given grating pattern of a light reflection grating, the relationship between the voltage V of incident light detected by a light detecting element and the intensities $I\lambda1$ to $I\lambda n$ of the light at wavelengths $\lambda1$ to $\lambda n$ can be expressed by equation (1), which is indicated below. The voltage V detected by the light detecting element corresponds to the light quantity of the light incident on the light detecting element. Also, "a1" to "an" of equation (1) represent coefficients that vary depending on the grating pattern of the light reflection grating.

$$V = a1 \times I\lambda1 + a2 \times I\lambda2 + \ldots + an \times I\lambda n \quad (1)$$

The storage unit 73 stores the relationship between positions of the movable beams 333 in a plurality of different grating patterns of the light reflection grating 330 and the corresponding coefficients "a1" to "an" for the different grating patterns. That is, the storage unit 73 stores the relationship between a voltage based on a light quantity to be detected by the light detecting element 50 and corresponding light intensities at a plurality of different wavelengths for the plurality of different grating patterns. The grating control unit 71 of the control unit 70 performs control for altering the grating pattern of the light reflection grating 30 to a different grating pattern. Under control of the grating control unit 71, the movable grating drive power source 60 applies a voltage between corresponding pairs of the fixed electrodes 32a to 32l and the movable gratings 33a to 33l. That is, the grating control unit 71 controls the movable grating drive power source 60 to apply a voltage between predetermined pairs of the fixed electrodes 32a to 32l and the movable gratings 33a to 33l so that the light reflection grating 330 is arranged into one of the grating patterns stored in the storage unit 73.

In the present embodiment, the grating pattern of the light reflection grating 330 is rearranged into n or more different grating patterns, the light detecting element 50 detects voltages V1 to Vn for each of the different grating patterns, and an inverse operation is performed based on the determinant represented by the formula as described above. In this way, the intensities $I\lambda1$ to $I\lambda n$ of light at the wavelengths $\lambda1$ to $\lambda n$ can be calculated. Note that "a11" to "ann" in the above formula are coefficients. The inverse operation based on the determinant represented by the above formula is performed by the computation unit 72 of the control unit 70.

The spectral measurement device 300 according to the present embodiment can obtain spectral characteristics of incident light based on the intensities $I\lambda1$ to $I\lambda n$ of light at the wavelengths $\lambda1$ to $\lambda n$ that have been obtained by the above inverse operation.

Figure 19:
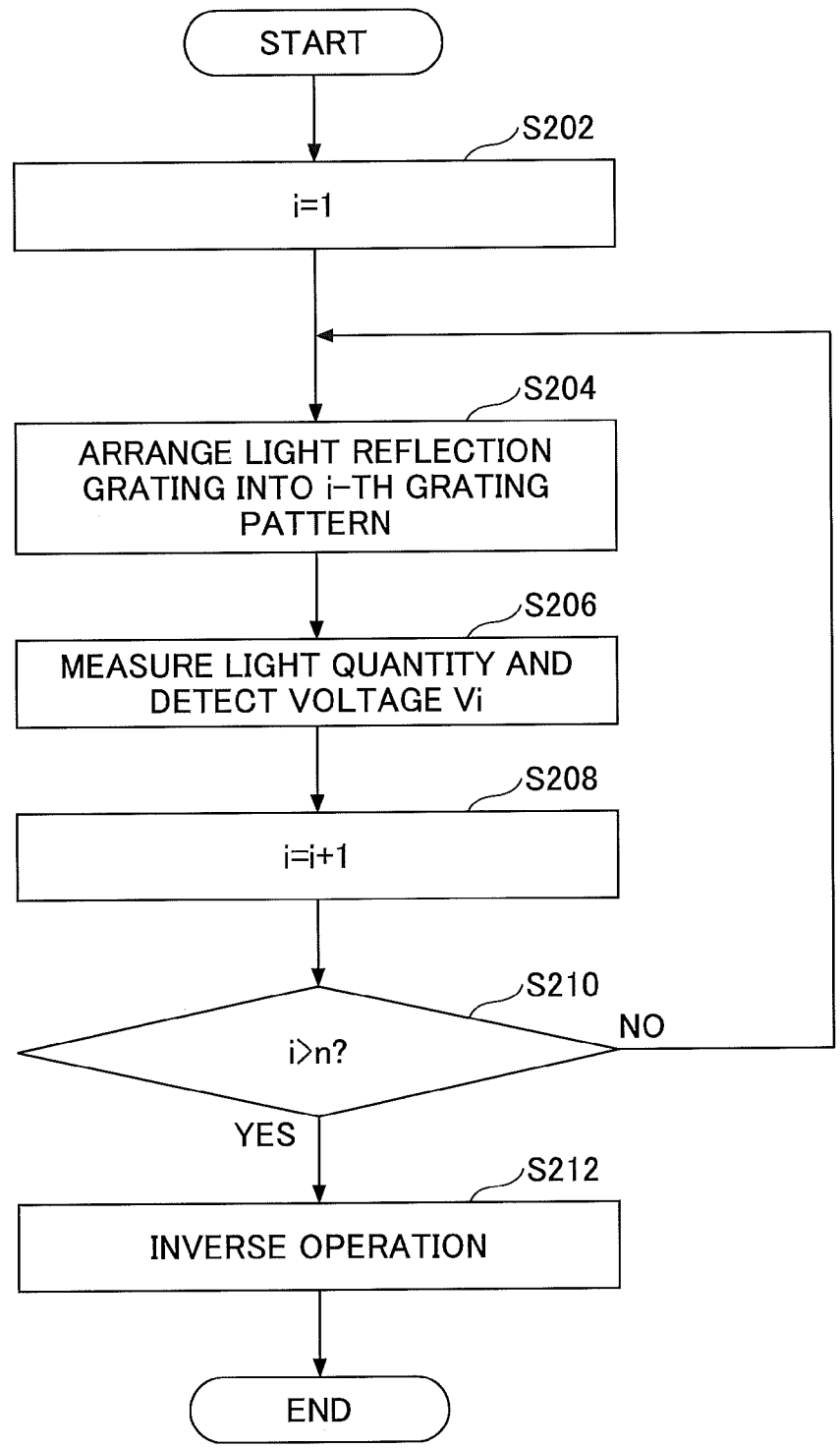
FIG. 19 is a flowchart illustrating an example spectral measurement method implemented by the spectral measurement device according to the third embodiment.

In the following, an example spectral measurement method implemented by the spectral measurement device 300 according to the present embodiment will be described with reference to FIG. 19. FIG. 19 is a flowchart illustrating an example spectral measurement method that is controlled by the control unit 70 of the spectral measurement device 300 according to the present embodiment. In the present example, it is assumed that the relationship between 1st to n-th grating patterns and the corresponding coefficients "a11" to "ann" of the above formula for the determinant is obtained in advance through measurement and/or calculation and stored in the storage unit 73.

In step S202, the variable "i" is set to "1" (i=1).

Then, in step S204, the movable grating drive power source 60 applies a voltage to the movable beams 333 under control of the grating control unit 71 such that the grating pattern of the light reflection grating 330 is arranged into an i-th grating pattern.

Then, in step S206, a voltage Vi corresponding to the light quantity of light incident on the light detecting element 50 while the light reflection grating 330 is in the i-th grating pattern is obtained. The detected voltage Vi is temporarily stored in the control unit 70.

Then, in step S208, a value obtained by adding 1 to the current value of the variable "i" is set up as a new value for the variable "i".

Then, in step S210, a determination is made as to whether the value of "i" exceeds "n". If the value of "i" exceeds "n", the process proceeds to step S212. If the value of "i" does not exceed "n", the process goes back to step S204 and the processes of steps S204 to S208 are repeated.

Then, in step S212, based on information stored in the storage unit 73 and the voltages V1 to Vn detected by the light detection element 50 for each of the different grating patterns, the computation unit 72 performs the inverse operation based on the determinant represented by the above formula. In this way, the intensities Iλ1 to Iλn of light at the wavelengths λ1 to λn can be obtained, and the spectral characteristics of the incident light can be obtained.

According to an aspect of the present embodiment, the number of movable beams 333 may be increased to thereby increase the wavelength resolution, for example. Further, the light reflection grating 330 may be rearranged into more than n different grating patterns, and the light detecting element 50 may detect the light quantity for each of the different grating patterns. In this way, accuracy of the obtained light spectrum may be further improved, for example.

Figure 20A:
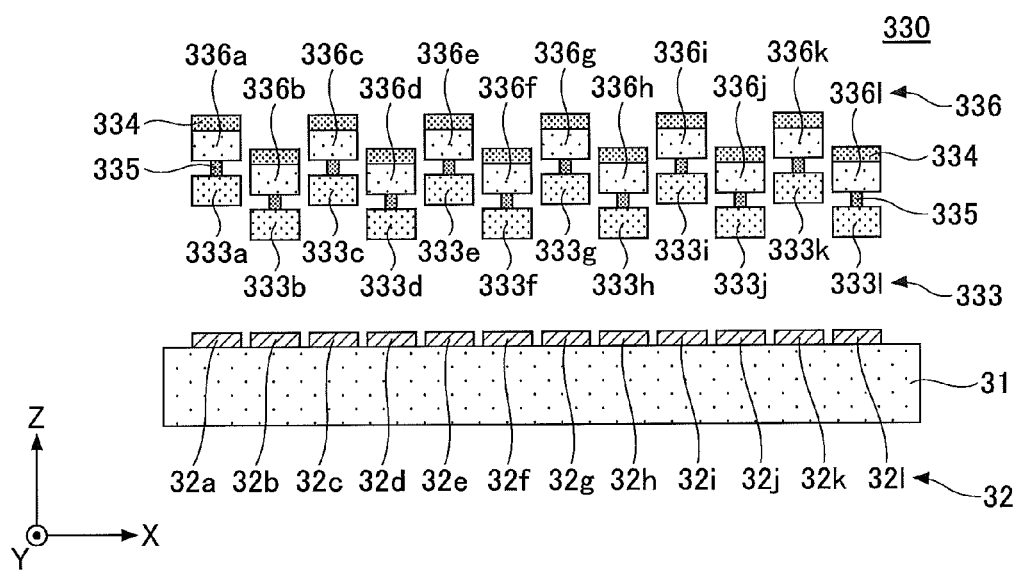
FIGS. 20A-20C are diagrams illustrating other example grating patterns of the light reflection grating according to the third embodiment.
Figure 20B:
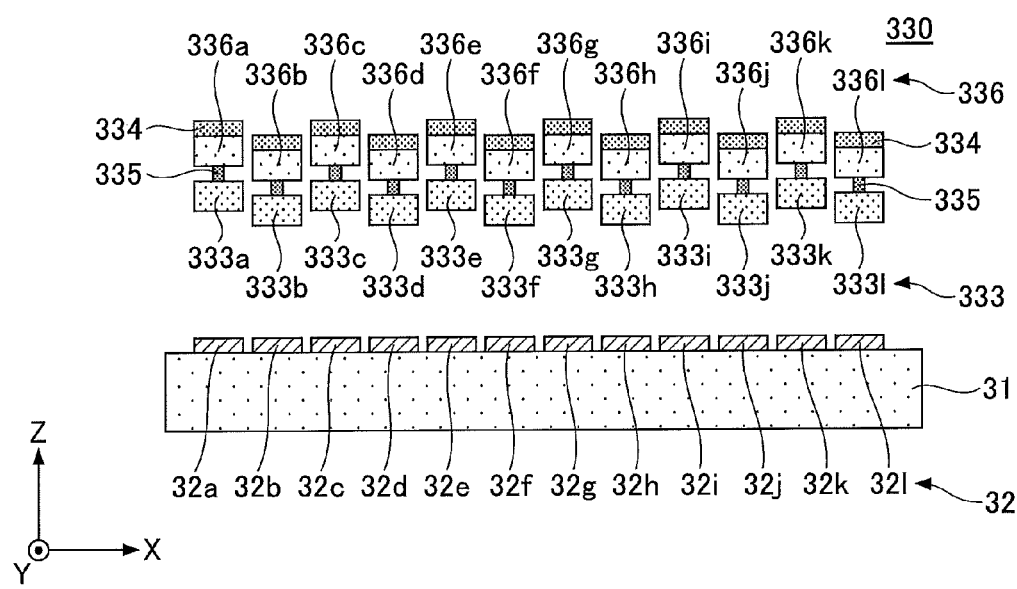
Figure 20C:
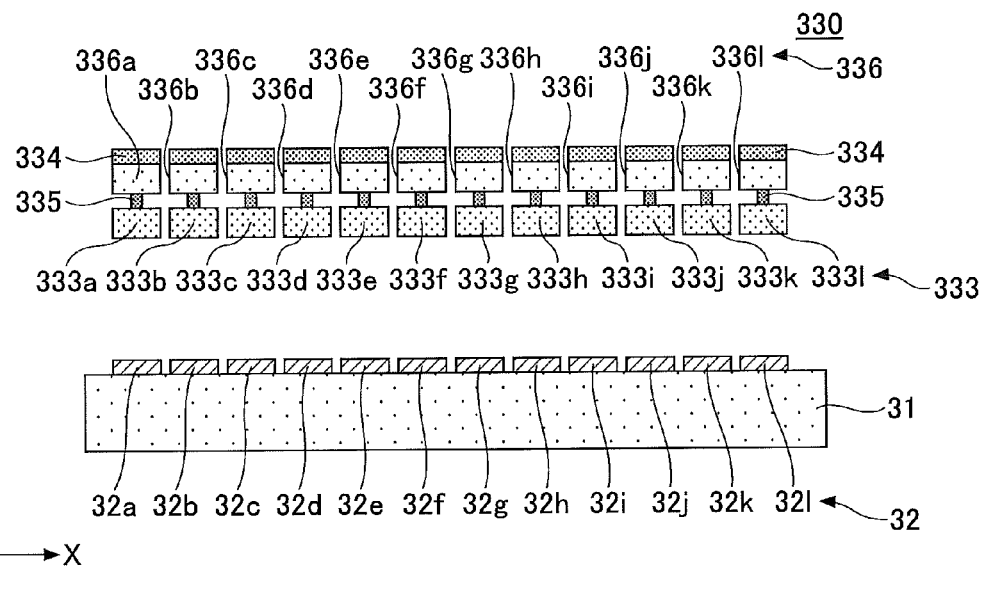

Note that in the example described above, the light reflection grating 330 is arranged into n different grating patterns. However, in other examples of the present embodiment, the amount of displacement of the movable beams 333 may be varied while the light reflection grating 330 is in the same grating displacement pattern. Specifically, for example, the light reflection grating 330 may be arranged such that every other movable grating 33 is displaced downward. In such state, the amount of displacement of the displaced movable beams 333 may be increased as illustrated in FIG. 20A, or the amount of displacement of the displaced movable gratings 33 may be decreased as illustrated in FIG. 20B, and the light detecting element 50 may measure the light quantity of incident light for each variation in the amount of displacement of the movable beams 333. For example, displacement of the movable beams 333 may be controlled to be in n different amounts of displacement, the light detecting element 50 may detect voltages V1 to Vn for the respective amounts of displacement, and an inverse operation may be performed using the determinant represented by a formula similar to the above formula but with different coefficients. In this way, the intensities Iλ1 to Iλn of light at wavelengths λ1 to λn may be calculated. Note that FIG. 20C illustrates an example case where no voltage is applied between the fixed electrodes 32 and the movable beams 333.

Figure 21A:
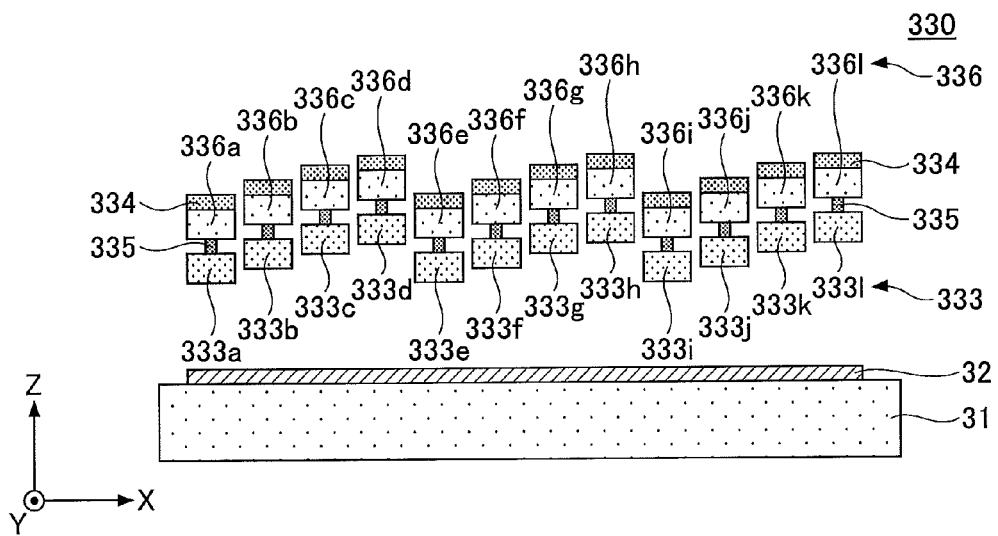
FIGS. 21A-21C are diagrams illustrating an alternative configuration of the light reflection grating according to the third embodiment.
Figure 21B:
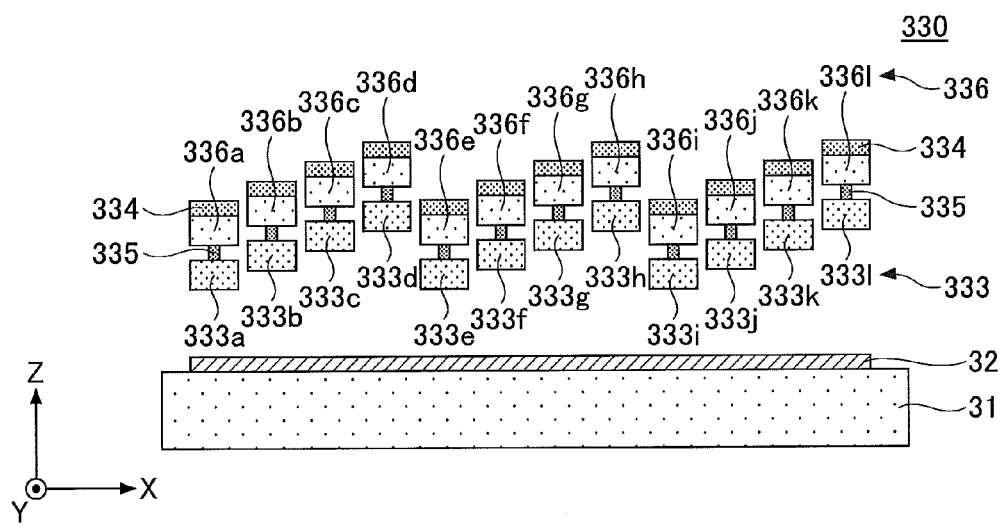
Figure 21C:
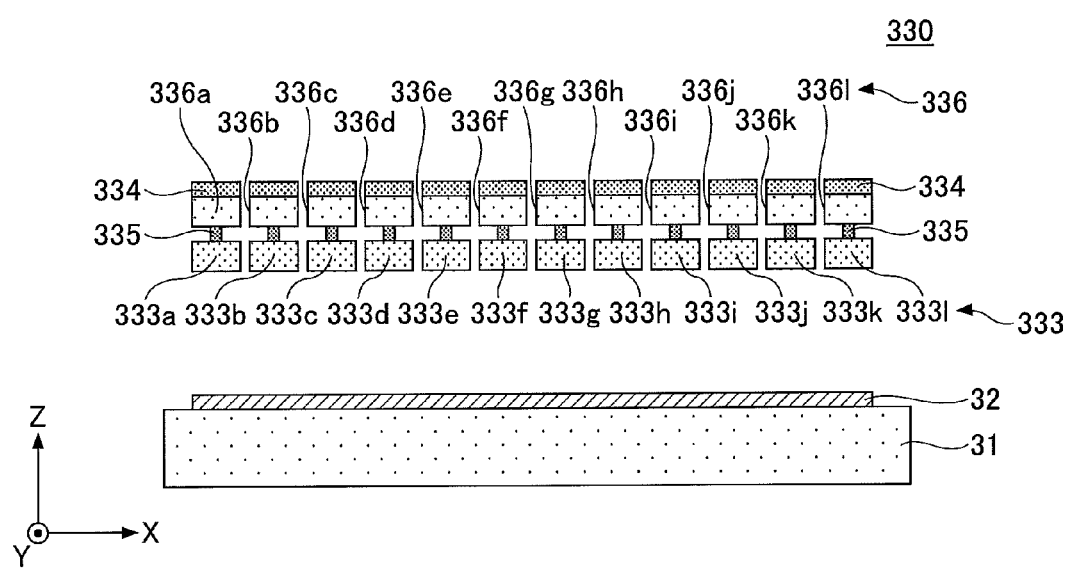

Also, the light reflection grating 330 of the spectral measurement device 300 according to the present embodiment may have an alternative configuration as illustrated in FIGS. 21A-21C in which one common fixed electrode 32 is provided in place of the plurality of fixed electrodes 32a to 32l on the bottom surface 31b of the recess 31a of the substrate 31. Even with such a configuration, a desired grating pattern of the light reflection grating 330 can be obtained by controlling the potential of the fixed electrode 32 to be constant and varying the voltage applied to each of the movable beams 333a to 333l. FIG. 21A illustrates an example case where the movable beams 333 are displaced in four different amounts of displacement. Specifically, a voltage Va1 is applied between the fixed electrode 32 and the movable beams 333a, 333e, and 333i. A voltage Va2 is applied between the fixed electrode 32 and the movable beams 333b, 333f, and 333j. A voltage Va3 is applied between the fixed electrode 32 and the movable beams 333c, 333g, and 333k. A voltage Va4 is applied between the fixed electrode 32 and the movable beams 333d, 333h, and 333l. Note that the voltages Va1 to Va4 have the following relationship: Va1>Va2>Va3>Va4. FIG. 21B illustrates an example case where the voltages Va1 to Va4 are increased while maintaining the relationship Va1>Va2>Va3>Va4. FIG. 9C illustrates an example case where no voltage is applied between the fixed electrode 32 and the movable beams 333.

Figure 22:
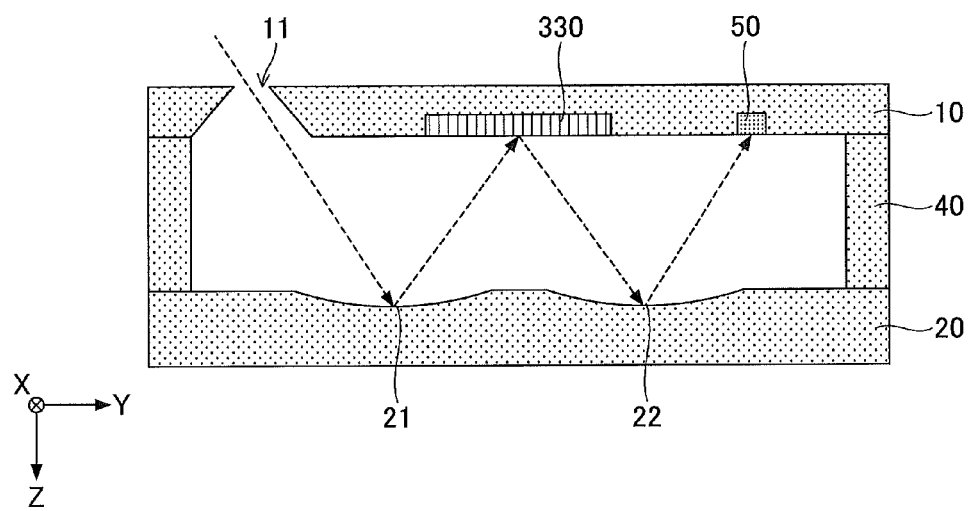
FIG. 22 is a diagram illustrating an alternative configuration of the spectral measurement device according to the third embodiment.

Further, the spectrum measurement device 300 according to the present embodiment may have an alternative configuration as illustrated in FIG. 22 in which the light detecting element 50 is arranged in the first substrate 10 on one surface of the first substrate 10. In this case, the light exit portion 12 does not have to be provided in the first substrate 10. The light detecting element 50 is arranged at a position where light incident through the light entrance portion 11 and reflected by the first concave light reflecting portion 21, the light reflection grating 30, and the second concave light reflecting portion 22 is brought into focus. By forming the light detecting element 50 within the first substrate 10 on one surface of the first substrate 10, further miniaturization of the spectral measurement device may be achieved. Also, assembly of the spectral measurement device may be simplified as compared with the configuration in which the light detecting element 50 is provided outside, and in this way, manufacturing costs can be reduced, for example. Note that in a case where the light detecting element 50 is a Si photodiode, for example, the light detecting element 50 may be formed by a CMOS process using a Si substrate or an SOI (Silicon on Insulator) substrate.

In the spectral measurement device 300 according to an aspect of the present embodiment, the light detecting element 50 is configured to detect the light quantity of incident light for each of a plurality of grating patterns in which one or more of the movable beams 33 forming the light reflection grating 330 are displaced, and the light intensities of the light at various wavelengths are calculated based on the detected light quantity. With such a configuration, the light reflection grating 330 does not have to be rotated, and as such, the spectral measurement device 300 may be miniaturized and manufactured at a relatively low cost, for example. Further, because no drive system for rotating the light reflection grating 330 has to be provided, reliability of the spectral measurement device 300 may be improved, for example.

Fourth Embodiment

In the following, a light reflection grating 430 according to a fourth embodiment of the present invention will be described with reference to FIG. 23.

Figure 23:
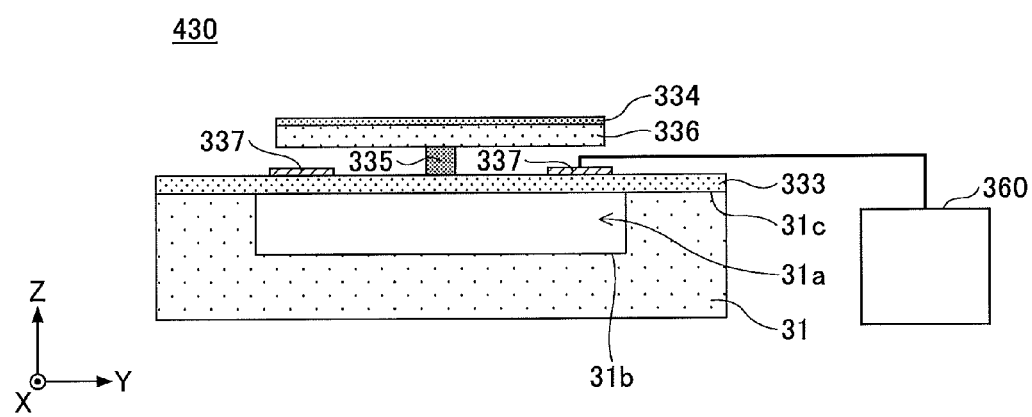
FIG. 23 is a diagram illustrating an example configuration of a light reflection grating according to a fourth embodiment of the present invention.

FIG. 23 is a cross-sectional view across the longitudinal direction of a grating forming the light reflection grating 430 according to the present embodiment. Note that in FIG. 23, direction X represents the lateral direction of the light reflection grating 430, direction Y represents the longitudinal direction of the light reflection grating 430, and direction Z represents a direction perpendicular to direction X and direction Y.

As illustrated in FIG. 23, the light reflection grating 430 according to the present embodiment uses a piezoelectric element 337 as a drive element for displacing the grating 336. In the light reflection grating 430 according to the present embodiment, the two longitudinal direction side ends of each of the plurality of movable beams 333 are supported on the upper surface 31c of the outer edge of the substrate 31 surrounding the recess 31a. In this way, each of the movable beams 333 is arranged to have a doubly supported beam configuration. Further, the piezoelectric elements 337 are formed on two sides of each movable beam 333.

Each movable beam 333 is made of a conductive metal material or a semiconductor material. The piezoelectric element 337 may be made of a PZT (lead zirconate titanate) thin film, for example. Further, in some examples, electrodes may be formed on the front and back side surfaces of the PZT film, and the movable beam 333 may be arranged to have low resistance such that the movable beam 333 can be used as a single-pole electrode.

In a spectral measurement device using the light reflection grating 430 according to the present embodiment, the movable beam drive power source 360 is connected to the piezoelectric element 337 so that the movable beam drive power source 360 can apply a voltage to the corresponding piezoelectric element 337 that drives the grating 336 to be driven. In this way, the movable beam 333 can be displaced, and the grating 336 can be displaced along with the movable beam 333.

The light reflection grating 430 according to the present embodiment can be used in place of the light reflection grating 330 according to the third embodiment.

Note that features of the light reflection grating 430 other than those described above may be substantially the same as those of the third embodiment.

Fifth Embodiment

In the following, an analysis apparatus according to a fifth embodiment of the present invention will be described. The analysis apparatus according to the present embodiment is a mobile analysis apparatus that uses the spectral measurement device according to the first embodiment or the second embodiment.

Figure 24:
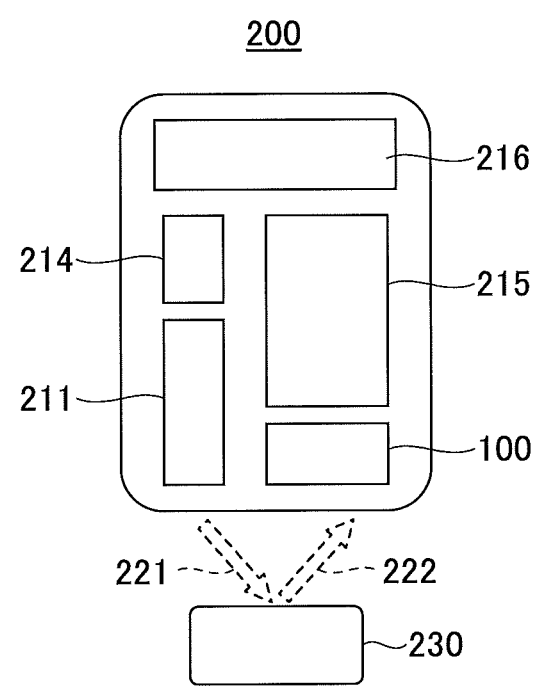
FIG. 24 is a diagram illustrating an example configuration of an analysis apparatus according to a fifth embodiment of the present invention.

FIG. 24 is a diagram illustrating an example configuration of a mobile analysis apparatus 200 according to the fifth embodiment. In FIG. 24, the mobile analysis apparatus 200 includes a light source 211, the spectral measurement device 100, a drive circuit 214, a processing circuit 215, and a battery 216 corresponding to a power source for the above components. In the present example, the spectral measurement device 100 according to the first embodiment is used. The drive circuit 214 drives the light source 211 and the spectral measurement device 100, and the processing circuit 215 performs various processes on a detected signal, such as amplification, A/D conversion, and communication of the detected signal. Note that the mobile analysis apparatus according to the present embodiment may use the spectral measurement device according to the second embodiment instead of the spectral measurement device 100, for example. In this case, the light detecting element 50 is provided on the light exiting side of the spectral measurement device.

In the mobile analysis apparatus 200 according to the present embodiment, emitted light 221 that is emitted from the light source 211 is irradiated on an object 230 to be measured, and the emitted light 221 is diffusely reflected by the object 230 while colliding with molecules in the object 230. The diffusely reflected light 222 enters the spectral measurement device 100 to be detected by the light detecting element 50 provided in the spectral measurement device 100. In this way, the mobile analysis apparatus 200 according to the present embodiment can obtain a wavelength spectrum characteristic of the molecular structure of the object 230.

According to an aspect of the present embodiment, by using the spectral measurement device according to the first embodiment or the second embodiment, the mobile analysis apparatus 200 can be manufactured at a relatively low cost and miniaturized so that mobility of the mobile analysis apparatus 200 can be improved. Also, note that the analysis apparatus according to the present embodiment does not have to include a battery and may acquire power from an external source, for example. Further, the analysis apparatus according to the present embodiment may use the spectral measurement device according to the third embodiment or the fourth embodiment, for example. With such a configuration, further miniaturization and weight reduction of the analysis apparatus can be achieved such that mobility of the analysis apparatus can be further improved, for example.

Although the present invention has been described above with reference to certain illustrative embodiments, the present invention is not limited to these embodiments, and numerous variations and modifications may be made without departing from the scope of the present invention.

What is claimed is:

1. A spectral measurement device comprising:
   a light reflection grating including a plurality of movable gratings arranged side by side along a lateral direction to have a same length in a longitudinal direction, and a movable grating drive power source configured to displace the plurality of movable gratings, wherein a grating pattern of the light reflection grating is altered by the movable grating drive power source displacing at least one of the plurality of movable gratings;
   a light detecting element configured to detect light that is incident on the light reflection grating and reflected by the light reflection grating;
   a memory storing a relationship between a light quantity to be detected by the light detecting element and corresponding light intensities at a plurality of different wavelengths for each of a plurality of different grating patterns of the light reflection grating; and
   a processor configured to calculate light intensities at the plurality of different wavelengths of the light incident on the light reflection grating based on a detected light quantity of the incident light detected by the light detecting element for each of the plurality of different grating patterns by altering the grating pattern of the light reflection grating based on the relationship between the light quantity to be detected by the light detecting element and the corresponding light intensities at the plurality of different wavelengths for each of the plurality of different grating patterns stored in the memory.

2. The spectral measurement device according to claim 1, wherein
   the light reflection grating includes a substrate having a recess formed therein and a fixed electrode formed on a bottom surface of the recess;

at least one longitudinal direction side end portion of each of the plurality of movable gratings is supported on an upper surface of an outer edge of the recess formed in the substrate; and the movable grating drive power source applies a voltage between the fixed electrode and at least one of the movable gratings such that an electrostatic force produced by the applied voltage causes the at least one of the movable gratings to be displaced toward the fixed electrode.

3. The spectral measurement device according to claim 1, wherein the light reflection grating includes a substrate, a fixing support portion formed on the substrate, and a fixed electrode formed on a surface of the substrate;

at least one longitudinal direction side end portion of each of the plurality of movable gratings is supported by the fixing support portion; and the movable grating drive power source applies a voltage between the fixed electrode and at least one of the movable gratings such that an electrostatic force produced by the applied voltage causes the at least one of the movable gratings to be displaced toward the fixed electrode.

4. The spectral measurement device according to claim 1, wherein the light reflection grating includes a substrate and a fixing support portion formed on the substrate;

at least one longitudinal direction side end portion of each of the plurality of movable gratings is supported by the fixing support portion;

each of the plurality of movable gratings includes a piezoelectric element; and the movable grating drive power source applies a voltage to the piezoelectric element of at least one of the movable gratings such that the at least one of the movable gratings including the piezoelectric element that is applied the voltage is displaced.

5. The spectral measurement device according to claim 1, wherein the light reflection grating includes a substrate and a fixing support portion formed on the substrate;

at least one longitudinal direction side end portion of each of the plurality of movable gratings is supported by the fixing support portion;

each of the plurality of movable gratings is formed of a piezoelectric material; and the movable grating drive power source applies a voltage to at least one of the movable gratings such that the at least one of the movable gratings that is applied the voltage is displaced.

6. The spectral measurement device according to claim 1, further comprising:

a light entrance portion into which light is incident;

a first reflecting portion that reflects the light incident through the light entrance portion and causes the light to be incident on the light reflection grating; and a second reflecting portion that reflects the light reflected by the light reflection grating and causes the light to be incident on the light detecting element.

7. The spectral measurement device according to claim 1, further comprising:

a grating control unit that controls a voltage applied by the movable grating drive power source such that the grating pattern of the light reflection grating is arranged into one of the plurality of different grating patterns stored in the memory.

8. The spectral measurement device according to claim 1, wherein each of the plurality of movable gratings includes a grating portion, a connecting portion, and a movable portion; and the grating pattern of the light reflection grating is altered by displacing the movable portion of at least one of the movable gratings.

9. An analysis apparatus comprising:

the spectral measurement device according to claim 1; and a light source;

wherein the light source irradiates light on an object to be measured, the object reflects the light from the light source, and the spectral measurement device spectrally separates the light reflected by the object to obtain a wavelength spectrum of the object.

10. A light detector comprising:

a plurality of movable gratings arranged side by side along a lateral direction to have a same length in a longitudinal direction;

a light reflection grating having a grating pattern that is altered by displacing at least one of the plurality of movable gratings; and a light detecting element configured to detect light that is incident on the light reflection grating and reflected by the light reflection grating;

wherein the grating pattern of the light reflection grating is altered based on a relationship between a light quantity to be detected by the light detecting element and corresponding light intensities at a plurality of different wavelengths for each of a plurality of different grating patterns.

11. The spectral measurement device according to claim 2, further comprising:

a light entrance portion into which light is incident;

a first reflecting portion that reflects the light incident through the light entrance portion and causes the light to be incident on the light reflection grating; and a second reflecting portion that reflects the light reflected by the light reflection grating and causes the light to be incident on the light detecting element.

12. The spectral measurement device according to claim 3, further comprising:

a light entrance portion into which light is incident;

a first reflecting portion that reflects the light incident through the light entrance portion and causes the light to be incident on the light reflection grating; and a second reflecting portion that reflects the light reflected by the light reflection grating and causes the light to be incident on the light detecting element.

13. The spectral measurement device according to claim 4, further comprising:

a light entrance portion into which light is incident;

a first reflecting portion that reflects the light incident through the light entrance portion and causes the light to be incident on the light reflection grating; and a second reflecting portion that reflects the light reflected by the light reflection grating and causes the light to be incident on the light detecting element.

14. The spectral measurement device according to claim 5, further comprising:

a light entrance portion into which light is incident;

a first reflecting portion that reflects the light incident through the light entrance portion and causes the light to be incident on the light reflection grating; and a second reflecting portion that reflects the light reflected by the light reflection grating and causes the light to be incident on the light detecting element.

15. The spectral measurement device according to claim 2, further comprising:
   a grating control unit that controls a voltage applied by the movable grating drive power source such that the grating pattern of the light reflection grating is arranged into one of the plurality of different grating patterns stored in the memory.

16. The spectral measurement device according to claim 3, further comprising:
   a grating control unit that controls a voltage applied by the movable grating drive power source such that the grating pattern of the light reflection grating is arranged into one of the plurality of different grating patterns stored in the memory.

17. The spectral measurement device according to claim 4, further comprising:
   a grating control unit that controls a voltage applied by the movable grating drive power source such that the grating pattern of the light reflection grating is arranged into one of the plurality of different grating patterns stored in the memory.

18. The spectral measurement device according to claim 5, further comprising:
   a grating control unit that controls a voltage applied by the movable grating drive power source such that the grating pattern of the light reflection grating is arranged into one of the plurality of different grating patterns stored in the memory.

19. The spectral measurement device according to claim 6, further comprising:
   a grating control unit that controls a voltage applied by the movable grating drive power source such that the grating pattern of the light reflection grating is arranged into one of the plurality of different grating patterns stored in the memory.

* * * * *